United States Patent [19]

Iitsuka et al.

[11] Patent Number: 5,600,803
[45] Date of Patent: Feb. 4, 1997

[54] DATA TRANSFER SYSTEM AND METHOD USING DATA BUS HAVING BI-DIRECTIONAL SERIAL DATA LINE, CLOCK LINE AND BI-DIRECTIONAL CONTROL LINE

[75] Inventors: Hiroyuki Iitsuka; Takuya Nishimura, both of Katano, Japan

[73] Assignee: Matsushita Electric Industrial Co., Ltd., Osaka, Japan

[21] Appl. No.: 242,441

[22] Filed: May 13, 1994

[30] Foreign Application Priority Data

May 14, 1993 [JP] Japan .................................. 5-112860

[51] Int. Cl.$^6$ ....................................................... G06F 13/00
[52] U.S. Cl. ........................... 395/287; 395/856; 395/855; 395/850; 395/200.05; 364/222.2; 364/283.3; 364/238.3; 364/DIG. 1
[58] Field of Search ..................................... 395/280, 287, 395/800, 725, 287, 856, 299; 340/825.5, 172.5; 358/148; 370/85.4; 341/177; 348/510

[56] References Cited

FOREIGN PATENT DOCUMENTS 63-58567   3/1988   Japan .
4-332065  11/1992   Japan .

Primary Examiner—Thomas G. Black
Assistant Examiner—Greta L. Robinson
Attorney, Agent, or Firm—Wenderoth, Lind & Ponack

[57] ABSTRACT

A data transfer system including a plurality of microcomputers connected to a serial data bus in parallel to each other, one of which is designated as a controller and remainder as targets each having its own sending order of data allocated beforehand, in which the controller asserts a control line of the serial data bus to start a data frame or a null frame sending to a data line of the serial data bus and each target outputs an output for asserting the control line while the control line is kept in an asserted state by the controller if it has a data frame sending request, and outputs a data frame or a null frame when its sending order has come.

11 Claims, 19 Drawing Sheets

Fig.5

| | msb bit6 | bit5 | bit4 | bit3 | bit2 | bit1 | lsb | |
|---|---|---|---|---|---|---|---|---|
| Group A  ID=1~63 | P  0 | X | | | N−1 | | | N=1~32 |
| Group B  ID=64~95 | P  1 | 0 | X | | N−1 | | | N=1~16 |
| Group C  ID=96~126 | P  1 | 1 | X | X | | N−1 | | N=1~8 |

DATA TRANSFER SYSTEM AND METHOD USING DATA BUS HAVING BI-DIRECTIONAL SERIAL DATA LINE, CLOCK LINE AND BI-DIRECTIONAL CONTROL LINE

BACKGROUND OF THE INVENTION

1. Field of the invention

The present invention relates to a data transfer method for transferring data frames between plural devices such as one-chip microcomputers (hereafter "microcomputers") using a serial data bus comprising three signal lines, specifically a data line, clock line, and control line.

2. Description of the prior art

Data transfer methods can be broadly categorized as parallel transfer methods using a parallel data bus, or serial transfer methods using a serial data bus (hereafter "serial bus"). While parallel transfer is well-suited to high speed data transfers, this method also tends to increase the number of pins required in the communicating devices, i.e., microcomputers and ICs. While serial transfer methods tend to be slower than parallel transfers, fewer pins are required and the transfer rate is still sufficient for many microcomputer applications, including the microcomputers used in audio/visual equipment and home appliances which typically use serial transfer methods. With the increasing functionality of consumer electronics, plural microcomputers are often used in single products such as video cassette recorders and camcorders.

In products such as these, the microcomputers do not operate independently, but by exchanging data over serial buses. Various other IC and LSI devices can also be connected to this serial bus in addition to the microcomputers.

A data transfer method using a three-line serial bus is described in Japanese patent laid-open number HEI 4-332065, "data transfer method." The data transfer method described in this application uses, in addition to the data line and clock line, a control line for identifying the data being transferred as a token or a data frame. The microcomputer functioning as the controller distributes a token to each microcomputer connected to the serial bus in sequence when the control line is HIGH. When a microcomputer receives the token, obtains the access rights to the serial bus, and attempts to transfer a data frame over the bus, the microcomputer sets the control line to LOW to become the master and notify the other microcomputers of its use of the serial bus. If the control line is changed to LOW, the controller stops token distribution, and outputs the clock required for data frame transmission. The master begins data frame transmission based on this clock. When data frame transfer ends, the master resets the control line to HIGH. The controller thus detects when the control line is again HIGH to begin token distribution.

This data transfer method makes it possible to prevent data collisions on the bus, does not require modulation for transfers, and makes it possible to transfer data frames of any desired pattern. The drawbacks to this data transfer method (patent laid-open number HEI 4-332065) are described below.

With this conventional data transfer method, the controller distributes a token, and only the microcomputer that has received the token has the right to send a data frame. As a result, when another microcomputer transferring data frames over the serial bus is added, the token distribution program of the controller must be written to anticipate the addition of microcomputers that can become the master, and the token distribution program of the controller must be modified when masters that cannot be anticipated are added.

With the conventional data transfer method, the slave(s) that should receive the transferred data are also specified using an address header at the beginning of the data frame, and frame transfer is terminated when the acknowledge data is returned from the slave(s). As a result, it is also necessary to change the address data when a slave-dedicated microcomputer is added to this serial bus, and data transfers are disabled if the slave microcomputer is removed without changing the address. Thus, simply stated, one problem with this conventional data transfer method is that microcomputers cannot be easily added to or removed from the serial bus.

This problem of easily adding and removing microcomputers from a three-line serial bus was addressed in Japanese patent laid-open number SHO 63-58567, "serial interface serial bus method". With this method, the HIGH control line state is confirmed, the control line is then set LOW, an ID code is sent, and data transmission occurs when the received ID matches the transmitted ID code. When data transfer is completed, the control line is then reset HIGH. Because arbitration using tokens does not occur in this method, microcomputers can be easily added to and removed from the serial bus. It is also possible, however, that plural microcomputers will simultaneously send an ID code, resulting in collisions. As a result, it is not possible to contain the time from occurrence of the data send request to the actual data transfer termination within a predetermined period. When the data transfer frequency increases, the frequency of collisions increases, and the possibility that effective data transfer cannot be sustained also increases.

In the first conventional data transfer method (patent laid-open number HEI 4-332065) above, the non-controller microcomputers (the "targets" below) must also monitor the control line with external interrupts if efficient data transfer is to occur. Specifically, when the targets check the control line level in serial receiving interrupts rather than external interrupts, level detection errors can occur if the control line level is changed by the master during the period between issuing the serial receiving interrupt and checking the level.

One possible method of avoiding such detection errors is to make the master wait a predetermined period after completing transfer of one transfer unit before operating the control line, thus enabling the microcomputers other than the master to check the control line for a predetermined period after issuing the serial receiving interrupt. Simply stated, control line level detection errors are avoided by controlling the timing of control line operations.

Because this method requires the control line to be checked during a predetermined period, however, serial receiving interrupts must be accepted even when processing other interrupts. In addition, either a hardware or software timer is needed to regulate the timing of control line operations. As a result, the targets must monitor the control line using external interrupts because methods preventing detection errors by restricting the timing of control line operations impose numerous restrictions on system design.

The other problem with this conventional data transfer method (patent laid-open number 4-332065) is that the actual data transfer efficiency is poor because various types of control data (e.g., tokens, address data, error detection codes, and acknowledge data) must also be sent as part of the transfer protocol for each single frame data transfer.

SUMMARY OF THE INVENTION

Therefore, an object of the present invention is to provide a data transfer method whereby (a) transfer collisions do not occur during data frame transfer; (b) microcomputers can be easily added to and removed from the serial bus; (c) external interrupts are not required to monitor the control line; and (d) data transfer efficiency can be enhanced.

To achieve these objects, the data transfer method of the invention transfers data using the procedure described below. Devices connected to the serial bus are classified as controller or target by the invention. Only one controller exists on the serial bus, but plural targets can exist. The sending order of frames is predetermined, and the controller is first in the sending order.

The controller and one or more targets are connected to a serial bus comprising three signal lines, specifically a data line, a clock line, and a control line. The data line is a bidirectional signal line for serially transferring the data comprising the data frame in single transfer units. The clock line is a signal line used for intermittently supplying the unit clock, which is required for transferring one transfer unit of data, at a predetermined output timing from the controller to the target(s). The control line is a bidirectional signal line used for data transfer start and end notification.

The data transfer procedure of the invention is described below.

When the control line is HIGH, the controller begins LOW level output to the control line, and then transfers a data frame or null frame. Targets with a data frame send request begin outputting a LOW signal level to the control line while the control line is held LOW by the controller. The controller temporarily terminates LOW level output to the control line at the unit clock output timing after data frame or null frame sending ends.

If the control line remains LOW even after LOW level output ends, the unit clock is output after resuming LOW level output to the control line. The target outputting a LOW level to the control line begins data frame sending synchronized to the unit clock after the controller and all targets queued earlier in the sending order have completed null frame or data frame sending. The target that has completed data frame sending stops LOW level output to the control line before the output timing of the next unit clock.

The controller computes an error detecting code for all data sent over the data line while the control line is LOW, and sends this error detecting code after the control line becomes HIGH. All targets detect transfer errors using the data sent or received by that target over the data line, and the error detecting code received by that target; when an error is detected, a request code comprising at least one error detecting bit set to TRUE is sent.

One transfer unit is defined as the period from when the control line is first set LOW until the control line is again set LOW. One transfer unit therefore comprises both a LOW and a HIGH level control line period. Plural data frames can be sent during one transfer unit.

By means of the method of the present invention described above, collision-free data frame sending by all microcomputers with a send request is possible during the LOW control line period by following the predetermined sending order. Specifically, this method has the effect of preventing data frame collisions by assigning a unique sending order number to each microcomputer connected to the serial bus.

In addition, when the system configuration, i.e., the microcomputers connected to the serial bus, is modified by adding or removing one or more microcomputers to/from the serial bus, data transfer integrity can be maintained by simply assuring that a unique sending order number is assigned to each microcomputer on the bus. As a result, it is not necessary to modify the serial bus management program of the controller whenever the microcomputer configuration is changed.

A data header identifying each data frame is also added to the beginning of each data frame. Each microcomputer connected to the bus can then determine whether the current data frame should be received by reading this data header. More specifically, only a data header is added to each data frame, and address data identifying the data frame destination is not contained in the data frame. It is therefore not necessary to change the data frame when the microcomputer configuration is changed. As a result, the invention also makes it simple to add or remove microcomputers to/from the serial bus.

In addition, the controller changes the control line level immediately before outputting the unit clock, and the targets check the control line level immediately after unit clock input, and begin and end LOW level output to the control line. More specifically, the targets output a LOW level to the control line only when the control line is LOW, and control line level changes are therefore limited to immediately before the unit clock is output. As a result, accurate control line level detection is possible if the targets monitor the control line level immediately after the unit clock is input in software. The invention therefore has the further effect of not requiring the use of external interrupts to monitor the control line.

The controller also computes the error detecting code for all data sent over the data line during the LOW control line period using the data sent by the controller over the data line and the data received by the controller from the data line, and sends the error detecting code after the control line level becomes HIGH. All targets detect transfer errors using the data sent or received by that target over the data line, and the error detecting code received by that target; when an error is detected, a request code comprising at least one error detecting bit set to TRUE is sent at a predetermined timing. As a result, it is not necessary to add an error detecting code to each data frame, and yet the error detection capacity of this method is approximately equal to that of data transfer methods whereby an error detecting code is added to each data frame. It is also not necessary to acknowledge each received data frame, and efficient data frame transfers can be achieved.

An error detecting code for detecting transfer errors in the data header is also added to the data header. When the target detects a transfer error in the data header, output is stopped if a LOW level is being output to the control line. This ends the transfer unit immediately when an error is detected, and the invention thus has the further effect of preventing wasteful data transfers.

If the data frame that should be received by the controller and target is not received, a request code comprising at least one data frame request bit set to TRUE is sent. If the data frame request bit of the received request code is TRUE, the controller and all targets continue to send all data frames that should be sent by the respective device until the request bit in the request code is FALSE. As a result, the invention also has the effect of being able to receive the lost data even when the data frame having been received until now is lost by occurrence of a trouble such as reset.

Furthermore, if the data frame request bit is always TRUE, the device remains in a constant data send state. As a result, while the data transfer method of the invention is event-driven, it is also highly adaptable to systems used for constant data frame sending. When a constant-transfer serial bus is changed to an event-driven transfer bus, the communications program controlling data frame sending and receiving and the application program determining which data frames to send must both be changed. This is because the application program determines whether there have been any changes in the content of the data frames being sent. When the data transfer method of the invention is introduced to systems for constant data transfer, however, it is not necessary to change the application program at all if the data frame request bit is always TRUE.

The data length of the user data is also specified in the data header sent by the target. The controller thus sends a request code with a TRUE error detecting bit if the control line is reset HIGH before the specified user data length has been sent by the target. The invention thus has the effect of being able to invalidate a data frame transfer if the target sending the data frame is reset.

Also the present invention has the effect of being able to perform a data frame transfer surely, even if the startup time from reset fluctuates, by sending a request code making the error detection bit as true from the target when the control line is LOW at startup.

Furthermore, if the control line is LOW at startup, the clock is output to the clock line until the control line becomes HIGH. After the control line becomes HIGH, the controller then sends a request code with a TRUE error detecting bit. If the control line is HIGH at startup, the controller sends a request code with a TRUE error detecting bit at least twice before outputting a LOW level to the control line. As a result, the invention has the further effect of being able to dependably invalidate data sends during the transfer unit if the controller is reset in the middle of a transfer unit.

Furthermore, the effect of outputting the unit clock after the controller confirms that the target has completed data send preparations can also be obtained by executing the following procedure. Specifically, the target sending the data frame changes the data line to a LOW level when it has completed preparations for sending the one transfer unit of data comprising the data frame. The controller outputs the unit clock if the data line is LOW immediately before outputting the unit clock for data frame sending by the target. The controller can thus output the unit clock after confirming that the target has completed data send preparations by using the data line according to this procedure.

BRIEF DESCRIPTION OF THE DRAWINGS

The present invention will become more fully understood from the detailed description given below and the accompanying diagrams wherein:

FIG. 5 illustrates the relationship between the data header values and the number of bytes N in the user data;

DESCRIPTION OF PREFERRED EMBODIMENTS

The preferred embodiments of a data transfer method according to the present invention are described below, starting with a description of the system configuration.

Figure 1:
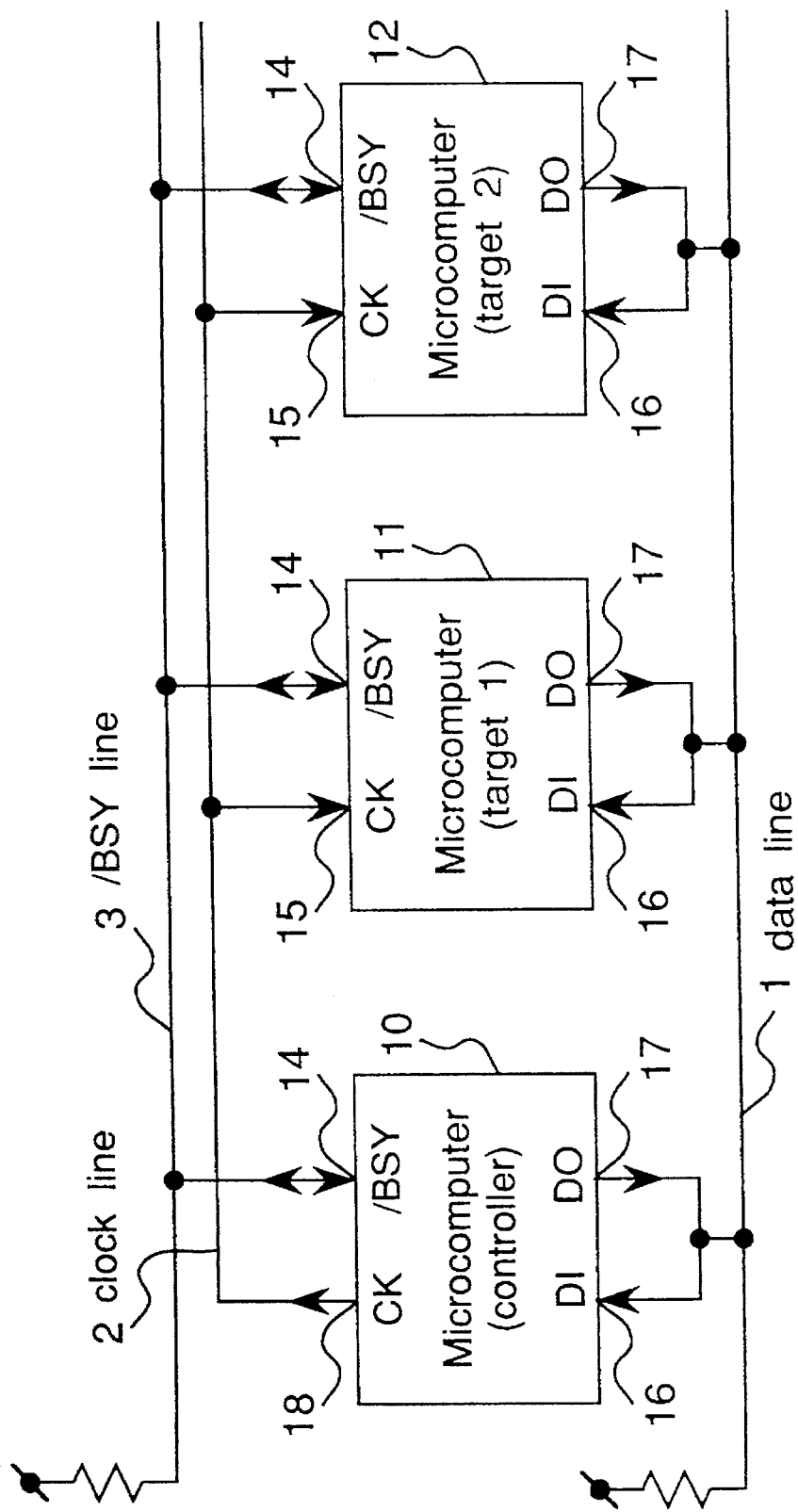
FIG. 1 is a block diagram of a system for transferring data using the data transfer method of the preferred embodiment of the invention.

FIG. 1 is a block diagram of a system for transferring data using the data transfer method of the preferred embodiment of the invention. As shown in FIG. 1, this system comprises microcomputers 10, 11, and 12 connected to each other via a serial bus comprising three signal lines: a data line 1, clock line 2, and /BSY line 3.

The data line 1 is a positive logic signal line for transferring serial data, and is connected in common to the data input port 16 and data output port 17 of each microcomputer. The data output ports 17 are open drain output ports so that plural microcomputers can simultaneously drive the signal lines.

Microcomputer 10 outputs the serial data I/O clock from the clock output port 18 to the clock line 2. The other microcomputers read this clock through the respective clock input ports 15.

The /BSY line 3 is the signal line for the /BSY signal. When /BSY line 3 is HIGH, none of the microcomputers (devices) on the bus is sending a data frame. When /BSY line 3 is LOW, a data frame or null frame transfer is occurring between microcomputers. The /BSY signal is a negative logic signal. The microcomputers 10, 11, and 12 output the /BSY signal from the /BSY signal I/O port 14, and check whether the /BSY signal is being output by one of the other microcomputers. Outputting a LOW level to the /BSY line 3 is equivalent to outputting the /BSY signal; stopping output of a LOW level to the /BSY line 3 is equivalent to stopping /BSY signal output.

In the following description, outputting a LOW level to the /BSY line 3 is referred to as "asserting the /BSY signal," and stopping output of a LOW level to the /BSY line 3 is referred to as "negating the /BSY signal." The /BSY line 3 is connected to each microcomputer with a wired-OR connection, thus causing the /BSY line 3 to be LOW if any one of the microcomputers asserts the /BSY signal.

Many single-chip microcomputers achieve an 8-bit serial data transfer function in a hardware construction referred to below as a "shift buffer." The shift buffer comprises two shift registers (a send buffer and a receive buffer), and peripheral circuitry. Clocks supplied from an external source (external clocks) to the microcomputer, and clocks generated internally to the microcomputer (internal clocks) are used to regulate data input and output. It is to be noted that some microcomputers use a single common shift register for both the send and receive buffers. In serial data transfers, data is sent from the send buffer from the most significant bit (MSB) at the clock fall, and serial data is input to the receive buffer from the MSB at the clock rise.

The output port of the serial data sent from the send buffer is the data output port 17, and the input port of serial data input to the receive buffer is the data input port 16. A single clock I/O port is used for both input and output. This port functions as the output port when the shift buffer transfers data at the internal clock, and functions as the input port when the shift buffer transfers data at the external clock. The one microcomputer 10 must output the clock and therefore operates according to the internal clock, but the other microcomputers operate according to the external clock. The clock I/O port therefore functions as the clock output port 18 in the one microcomputer 10, but functions as the clock input port 15 in the other microcomputers.

Specific terminology used in the following descriptions of the embodiment is defined below.

Controller: Of the plural microcomputers connected to the serial bus, the microcomputer that outputs the clock is the controller.

There is only one controller in the system. Microcomputer 10 is the controller in the system shown in FIG. 1, and is referred to as the controller below.

Targets: Of the plural microcomputers connected to the serial bus, all microcomputers that are not the controller are targets.

There must be at least one target connected to the serial bus. Microcomputers 11 and 12 are the targets in FIG. 1. Microcomputers 11 and 12 are therefore referred to as target 1 and target 2, respectively, below.

Master: The microcomputer currently sending the data frame is the master. The controller and all targets (targets 1 and 2 in FIG. 1) can become the master, but plural microcomputers cannot simultaneously be the master (i.e., there can only be one master at a time).

Slave: The microcomputer receiving the data frame is the slave. Data transfers are from master to slave.

Dedicated slave microcomputers, i.e., microcomputers that do not send data frames, can also be connected to the serial bus.

Data frame: A continuous data stream sent by any microcomputer is a data frame. Each data frame comprises a one byte data header and user data.

Byte clock: The clock required to transfer one byte is the byte clock.

Transfer unit: The smallest possible unit of transfer data; plural data frames can be transferred in one transfer unit.

Each transfer unit comprises a LOW and a HIGH /BSY signal period. Data frames are transferred during the LOW /BSY signal period; the CHK byte and other control data is transferred during the HIGH /BSY signal period.

The basic timing of the serial data, clock, and /BSY signal is described next with reference to FIG. 2.

Figure 2:
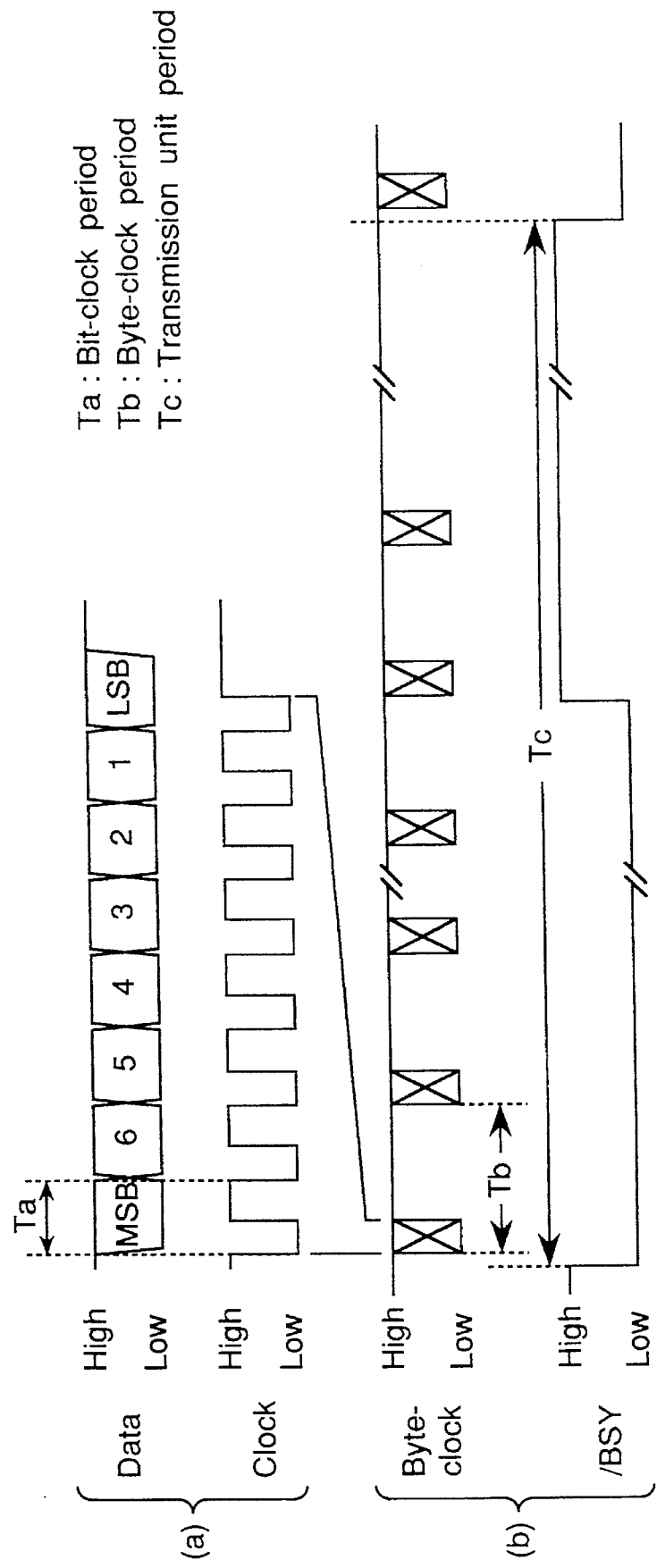
FIG. 2 is a timing chart showing the relationship between serial data, the clocks, and the /BSY line in the preferred embodiment.

FIG. 2 is a timing chart showing the relationship between serial data, the clocks, and the /BSY line in the preferred embodiment. As shown in FIG. 2(*a*), serial data sent over the data line 1 is output one bit at a time at the clock fall; serial data is read (input) at the clock rise. The clock cycle is Ta, and transfers are executed intermittently in 8-bit blocks.

The byte clock is defined as the eight clocks required to send 8 bits of data.

As shown in FIG. 2(*b*), the byte clock is output intermittently at the byte clock cycle Tb. The /BSY signal is asserted by the controller at the beginning of the transfer unit. Immediately after asserting the /BSY signal, the controller then outputs the byte clock. One or more byte clocks are output from the controller while the /BSY signal is being asserted. When the /BSY signal is LOW, each microcomputer can send a data frame. /BSY signal negation is also executed by the controller, immediately before outputting the byte clock. Two byte clocks are normally output during the HIGH /BSY signal period.

The transfer unit is defined as the period between successive /BSY line 3 drops. The transfer unit cycle is Tc.

The data sent over the data line 1 is described next. The data types that can be sent over the data line 1 are shown in Table 1.

TABLE 1

| /BSY | Name | Byte | Content |
|---|---|---|---|
| | Header | | |
| Low | Null header | 1 | Indicates a data frame is not sent |
| | Data header | 1 | Data type and number of bytes |
| | User header Data | N | Transmission data (N = 1–32) |
| High | CHK byte | 1 | Error detecting code for data sent when /BSY signal is LOW |
| | REQ byte | 1 | Notify master of data error, OR data output request |

Figure 3:
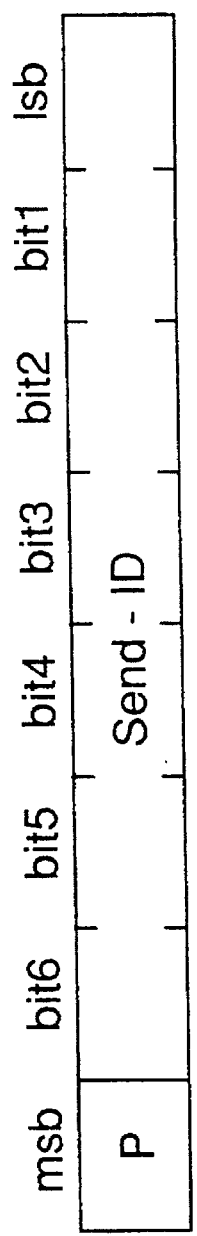
FIG. 3 illustrates the format of the header in the preferred embodiment.

The header is one byte of data sent when the /BSY signal is LOW. The header format is shown in FIG. 3, and comprises one parity bit and a seven bit send-ID. The MSB (Most Significant Bit) is the even parity bit of the send-ID. The send-ID value can also range from 0–127; the header is classified as one of three types (Table 2) by the value of the send-ID.

TABLE 2

| Send-ID value (bits 6–0) | Header name |
|---|---|
| 0 (0000000B) | (reserved) |
| 1–126 (0000001B–1111110B) | Data header |
| 127 (1111111B) | Null header |

Send-ID=0 is reserved for future expansion, and is not actually used. Headers with a send-ID value of 1–126 are the data header; the data header is followed by the user data. Headers with a send-ID value of 127 are null headers, the value of which is FFh (hexadecimal).

Figure 4:
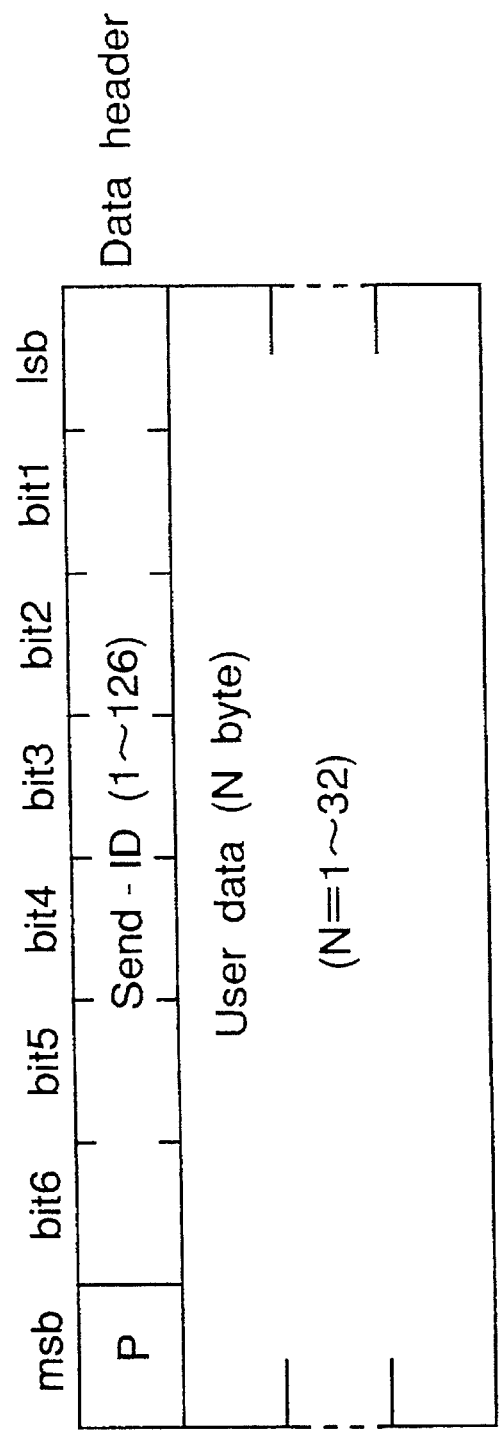
FIG. 4 illustrates the format of the data frame in the preferred embodiment.

Each data frame comprises a data header and user data, and is shown in FIG. 4. The user data sent after the data header may range in size from 1 to 32 bytes. The number of user data bytes N is determined from the send-ID. The relationship between the data header value and the number of user data bytes N is shown in FIG. 5. As shown in FIG. 5, data headers are categorized by the data header value as a group A, B, or C header. In FIG. 5, the value of X may be 0 or 1. Bit 6 of the data header associated with group A is 0. The group A data header shows the number of bytes N-1 with the lowest five bits. Bits 6 and 5 of the data header associated with group B are 1 and 0, respectively. The group B data header shows the number of bytes N-1 with the lowest four bits. Bits 6 and 5 of the data header associated with group B are 1 and 1, respectively. The group C data header shows the number of bytes N-1 with the lowest three bits.

The data transfer method of the invention can transfer 126 types of data frames because the send-ID values of the data frame can range from 1–126. The number of user data bytes is limited as shown in Table 3, however, because the number of user data bytes can be determined from the send-ID as shown in FIG. 5.

TABLE 3

| User data bytes N | Number of available send-ID | Assignment Group A | Group B | Group C |
|---|---|---|---|---|
| 1 | 7 | 1 | 2 | 4 |
| 2–7 | 8 | 2 | 2 | 4 |
| 8 | 7 | 2 | 2 | 3 |
| 9–16 | 4 | 2 | 2 | — |
| 17–32 | 2 | 2 | — | — |

For example, there can be up to eight types of data frames with five user data bytes. Sample values by data header group are shown in Table 4.

TABLE 4

| Group | Byte No. | Data header HEX | Binary |
|---|---|---|---|
| A | 1 | A0 | (1010 0000) |
| | 2 | 81 | (1000 0001) |
| | | 21 | (0010 0001) |
| | 3 | 82 | (1000 0010) |
| | | 22 | (0010 0010) |
| | 4 | 03 | (0000 0011) |
| | | A3 | (1010 0011) |
| | 5 | 84 | (1000 0100) |
| | | 24 | (0010 0100) |
| | 6 | 05 | (0000 0101) |
| | | A5 | (1010 0101) |
| | 7 | 06 | (0000 0110) |
| | | A6 | (1010 0110) |
| | 8 | 87 | (1000 0111) |
| | | 27 | (0010 0111) |
| | 9 | 88 | (1000 1000) |
| | | 28 | (0010 1000) |
| | 10 | 09 | (0000 1001) |
| | | A9 | (1010 1001) |
| | 11 | 0A | (0000 1010) |
| | | AA | (1010 1010) |
| | 12 | 8B | (1000 1011) |
| | | 2B | (0010 1011) |
| | 13 | 0C | (0000 1100) |
| | | AC | (1010 1100) |
| | 14 | 8D | (1000 1101) |
| | | 2D | (0010 1101) |
| | 15 | 8E | (1000 1110) |
| | | 2E | (0010 1110) |
| | 16 | 0F | (0000 1111) |
| | | AF | (1010 1111) |
| | 17 | 90 | (1001 0000) |
| | | 30 | (0011 0000) |
| | 18 | 11 | (0001 0001) |
| | | B1 | (1011 0001) |
| | 19 | 12 | (0001 0010) |
| | | B2 | (1011 0010) |
| | 20 | 93 | (1001 0011) |
| | | 33 | (0011 0011) |
| | 21 | 14 | (0001 0100) |
| | | B4 | (1011 0100) |
| | 22 | 95 | (1001 0101) |
| | | 35 | (0011 0101) |
| | 23 | 96 | (1001 0110) |
| | | 36 | (0011 0110) |
| | 24 | 17 | (0001 0111) |
| | | B7 | (1011 0111) |
| | 25 | 18 | (0001 1000) |
| | | B8 | (1011 1000) |
| | 26 | 99 | (1001 1001) |
| | | 39 | (0011 1001) |
| | 27 | 9A | (1001 1010) |
| | | 3A | (0011 1010) |
| | 28 | 1B | (0001 1011) |
| | | BB | (1011 1011) |
| | 29 | 9C | (1001 1100) |
| | | 3C | (0011 1100) |
| | 30 | 1D | (0001 1101) |
| | | BD | (1011 1101) |
| | 31 | 1E | (0001 1110) |
| | | BE | (1011 1110) |
| | 32 | 9F | (1001 1111) |
| | | 3F | (0011 1111) |
| B | 1 | C0 | (1100 0000) |
| | | 50 | (0101 0000) |
| | 2 | 41 | (0100 0001) |
| | | D1 | (1101 0001) |
| | 3 | 42 | (0100 0010) |
| | | D2 | (1101 0010) |
| | 4 | C3 | (1100 0011) |
| | | 53 | (0101 0011) |
| | 5 | 44 | (0100 0100) |
| | | D4 | (1101 0100) |
| | 6 | C5 | (1100 0101) |
| | | 55 | (0101 0101) |
| | 7 | C6 | (1100 0110) |
| | | 56 | (0101 0110) |
| | 8 | 47 | (0100 0111) |
| | | D7 | (1101 0111) |
| | 9 | 48 | (0100 1000) |
| | | D8 | (1101 1000) |
| | 10 | C9 | (1100 1001) |
| | | 59 | (0101 1001) |
| | 11 | CA | (1100 1010) |
| | | 5A | (0101 1010) |
| | 12 | 4B | (0100 1011) |
| | | DB | (1101 1011) |
| | 13 | CC | (1100 1100) |
| | | 5C | (0101 1100) |
| | 14 | 4D | (0100 1101) |
| | | DD | (1101 1101) |
| | 15 | 4E | (0100 1110) |
| | | DE | (1101 1110) |
| | 16 | CF | (1100 1111) |
| | | 5F | (0101 1111) |
| C | 1 | 60 | (0110 0000) |
| | | E8 | (1110 1000) |
| | | F0 | (1111 0000) |
| | | 78 | (0111 1000) |
| | 2 | E1 | (1110 0001) |
| | | 69 | (0110 1001) |
| | | 71 | (0111 0001) |
| | | F9 | (1111 1001) |
| | 3 | E2 | (1110 0010) |
| | | 6A | (0110 1010) |
| | | 72 | (0111 0010) |
| | | FA | (1111 1010) |
| | 4 | 63 | (0110 0011) |
| | | EB | (1110 1011) |
| | | F3 | (1111 0011) |
| | | 7B | (0111 1011) |
| | 5 | E4 | (1110 0100) |
| | | 6C | (0110 1100) |
| | | 74 | (0111 0100) |
| | | FC | (1111 1100) |
| | 6 | 65 | (0110 0101) |
| | | ED | (1110 1101) |
| | | F5 | (1111 0101) |
| | | 7D | (0111 1101) |
| | 7 | 66 | (0110 0110) |
| | | EE | (1110 1110) |
| | | F6 | (1111 0110) |

TABLE 4-continued

| Group | Byte No. | Data header HEX | Binary |
|---|---|---|---|
| | | 7E | (0111 1110) |
| | 8 | E7 | (1110 0111) |
| | | 6F | (0110 1111) |
| | | 77 | (0111 0111) |

The CHK byte (see Table 1) is the error check byte, and is the even parity byte for all data bytes sent during the LOW /BSY signal period. The CHK byte is computed and sent by the controller. The controller executes an exclusive-OR operation in byte units on all data sent during the LOW /BSY signal period, and sends the computation result at the first byte clock after the /BSY signal rise. For data sent by the controller, the data used for this operation is the data before it is sent. For data sent by the targets, the data received over the data line 1 is used for the operation.

Figure 6:
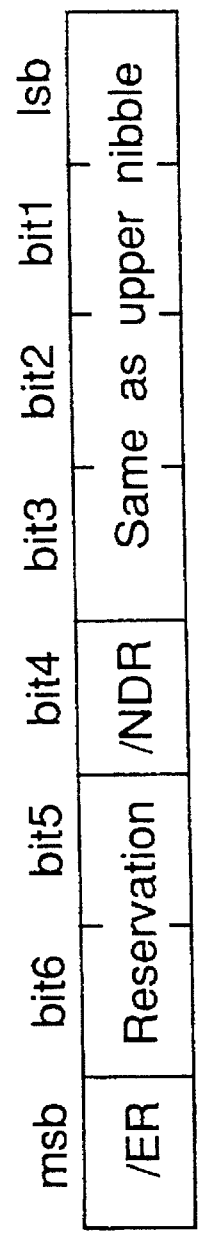
FIG. 6 illustrates the format of the REQ byte in the preferred embodiment.

The REQ byte is the data used for data frame send requests; the high and low nibbles have the same value. This byte is sent by all microcomputers, including dedicated slaves. Unlike the other bytes, sending and receiving this byte must be simultaneous. The REQ byte format is shown in FIG. 6, and the high and low nibbles have the same value as shown in FIG. 6.

An /ER bit value of 0 means a transfer error occurred in the data sent during the LOW /BSY signal period. All microcomputers must execute an error detection routine using the data sent during the LOW /BSY signal period. There are two error detection methods: (1) detecting errors in the data frame using the CHK byte, and (2) detecting errors in the header using the parity bit. The first error detection method is executed by all targets using the CHK byte sent by the controller. The latter error detection method is executed by all microcomputers.

If an error is detected, the detecting microcomputer sends a REQ byte in which the ER bit value is 0. The microcomputer that sent the data frame of the corresponding transfer unit confirms that the data was correctly received by detecting an ER bit value of 1. Whether the data is resent when a data error occurs is determined by each microcomputer. For example, if the value sent will have already changed by the time a resend can be executed, as occurs with time data, it is preferable to send the current value rather than resend the previous value. Microcomputer operating status data and other important data must be resent, however.

A /NDR bit value of 0 notifies the other microcomputers that one of the microcomputers connected to the serial bus has issued a data frame send request. In the data transfer method of this embodiment, a data frame is sent only when a user data value contained in the data frame has changed. As a result, this is referred to as "event-driven data transfer" because a data frame is transferred only when an event changing a data frame value occurs.

In event-driven data transfer systems, however, when any specific microcomputer is reset, the received data stored in that microcomputer is lost. In event-driven data transfer, however, the microcomputer(s) sending the lost data do not resend the data frame unless there is a change in a data value. This means that the reset microcomputer cannot obtain the required data, and the operation of the reset microcomputer cannot be guaranteed. The /NDR bit is used to avoid such situations. If the data frame that should be received by the controller and target is not received, a REQ byte with a /NDR bit value of 0 is sent. When the /NDR bit of the received REQ byte is 0, each microcomputer sends all data frames that it should send in turn until a REQ byte with a /NDR bit value of 1 is received.

The data frame sending order is described next.

The sending order for the data frames and null frames is determined for each microcomputer as shown in Table 5.

TABLE 5

| Sending order | | Microcomputer |
|---|---|---|
| Early | 0 | Controller (microcomputer 10) |
| ↑ | 1 | Target 1 (microcomputer 11) |
| | 2 | Target 2 (microcomputer 12) |
| ↓ | ... | ... |
| Late | K | Target K |

Data frame sending starts from the microcomputer first in the sending order after the /BSY signal becomes LOW. Microcomputers with no data frame to send announce there is no data frame to send by sending a 1-byte null frame. The null frame comprises a one byte null header, the value of which is FFh (hexadecimal) as described previously. The data line 1 is a positive logic signal line that is pulled up. As a result, not sending data is equivalent to sending a null header.

Each microcomputer can send the data frame from the next byte clock when all microcomputers earlier in the sending order have either completed frame sending or have signaled that no frame is to be sent (i.e., have sent a null frame). In other words, the microcomputer K in the sending order can begin data frame sending at the next byte clock when the total null frames and data frames sent by the other microcomputers equals K after the /BSY line 3 becomes LOW.

The /BSY signal assert timing and negate timing are described next.

The controller sends data or null frames after changing the /BSY line 3 from HIGH to LOW by asserting the /BSY signal at the beginning of the transfer unit. The target attempting to send a data frame asserts the /BSY signal after confirming the /BSY line 3 is LOW.

When a target completes data frame sending, it negates the /BSY signal immediately after sending the last data. The /BSY line 3 is held LOW at this time because the controller asserts the /BSY signal.

After the controller completes data frame or null frame sending, the controller first negates the /BSY signal before sending the byte clock or the CHK byte. If the /BSY line 3 is held LOW even through the /BSY signal is negated, the controller outputs a LOW to the /BSY line 3 before outputting the byte clock. If the /BSY line 3 becomes HIGH as a result of /BSY signal negation, the CHK byte is sent with the /BSY signal negated.

The actual data frame sending timing is described below with reference to FIGS. 7–10.

Figure 7:
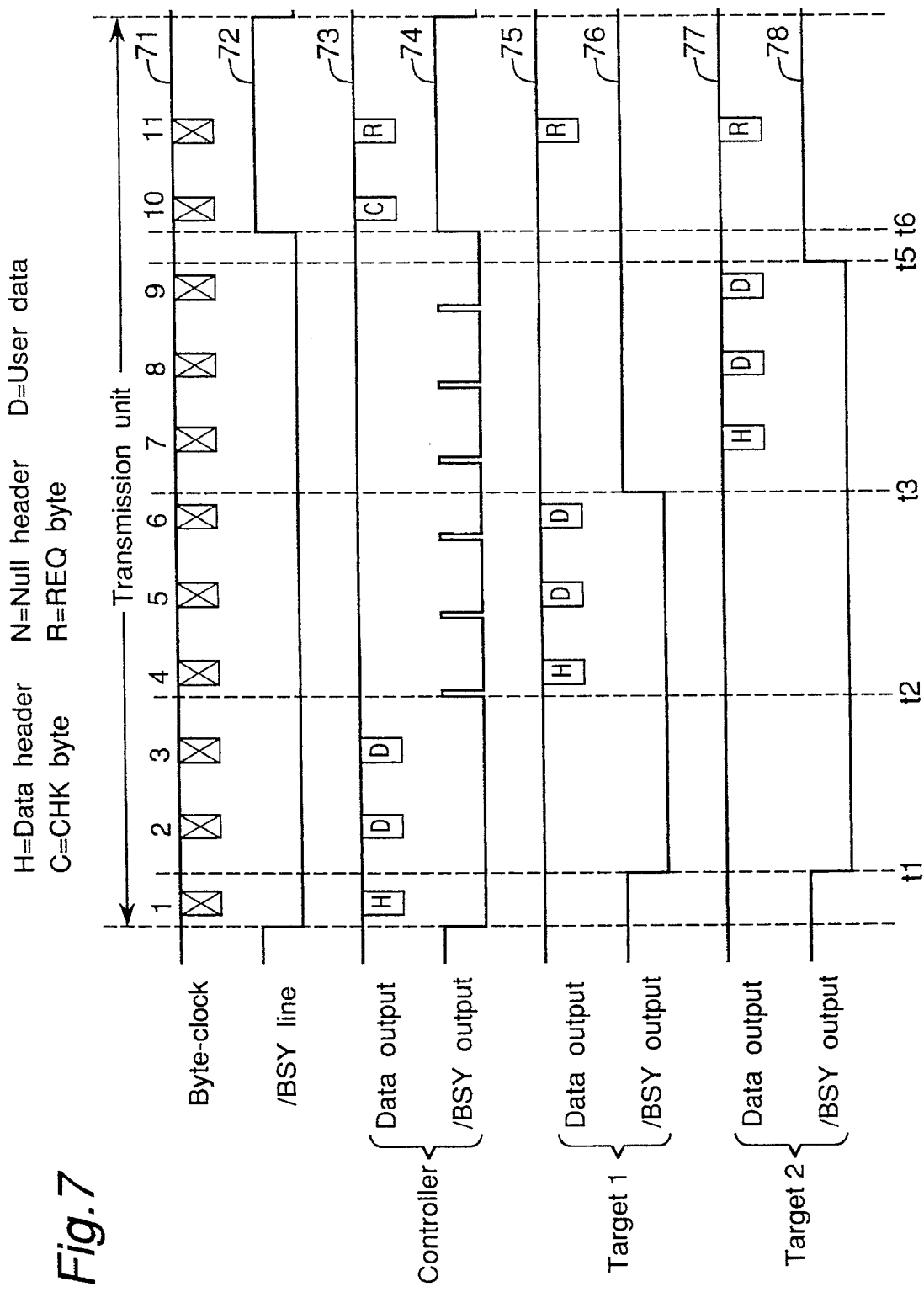
FIG. 7 is a timing chart showing one example of the data frame transfer timing in the preferred embodiment.
Figure 8:
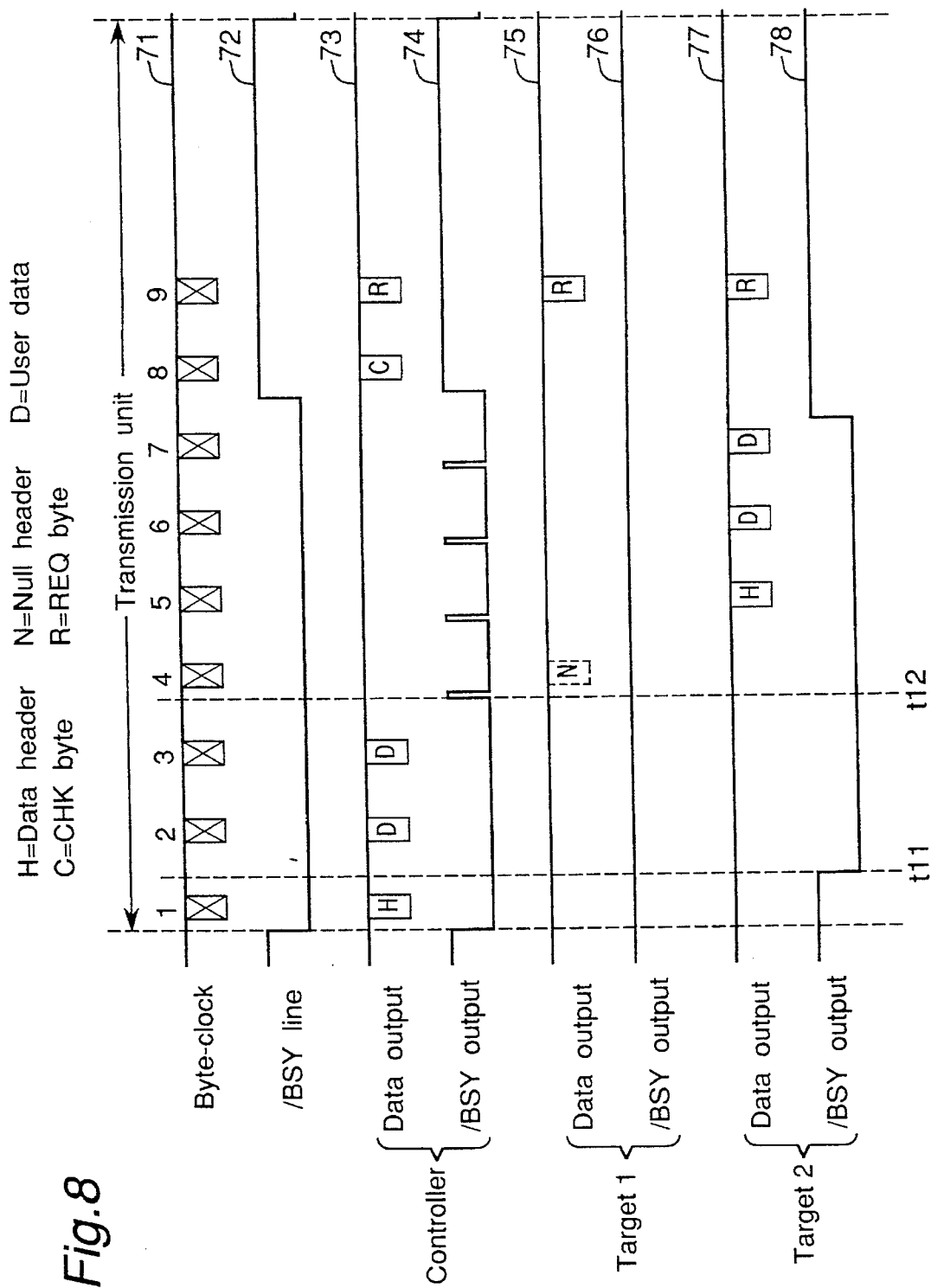
FIG. 8 is a timing chart showing one example of the data frame transfer timing in the preferred embodiment.
Figure 9:
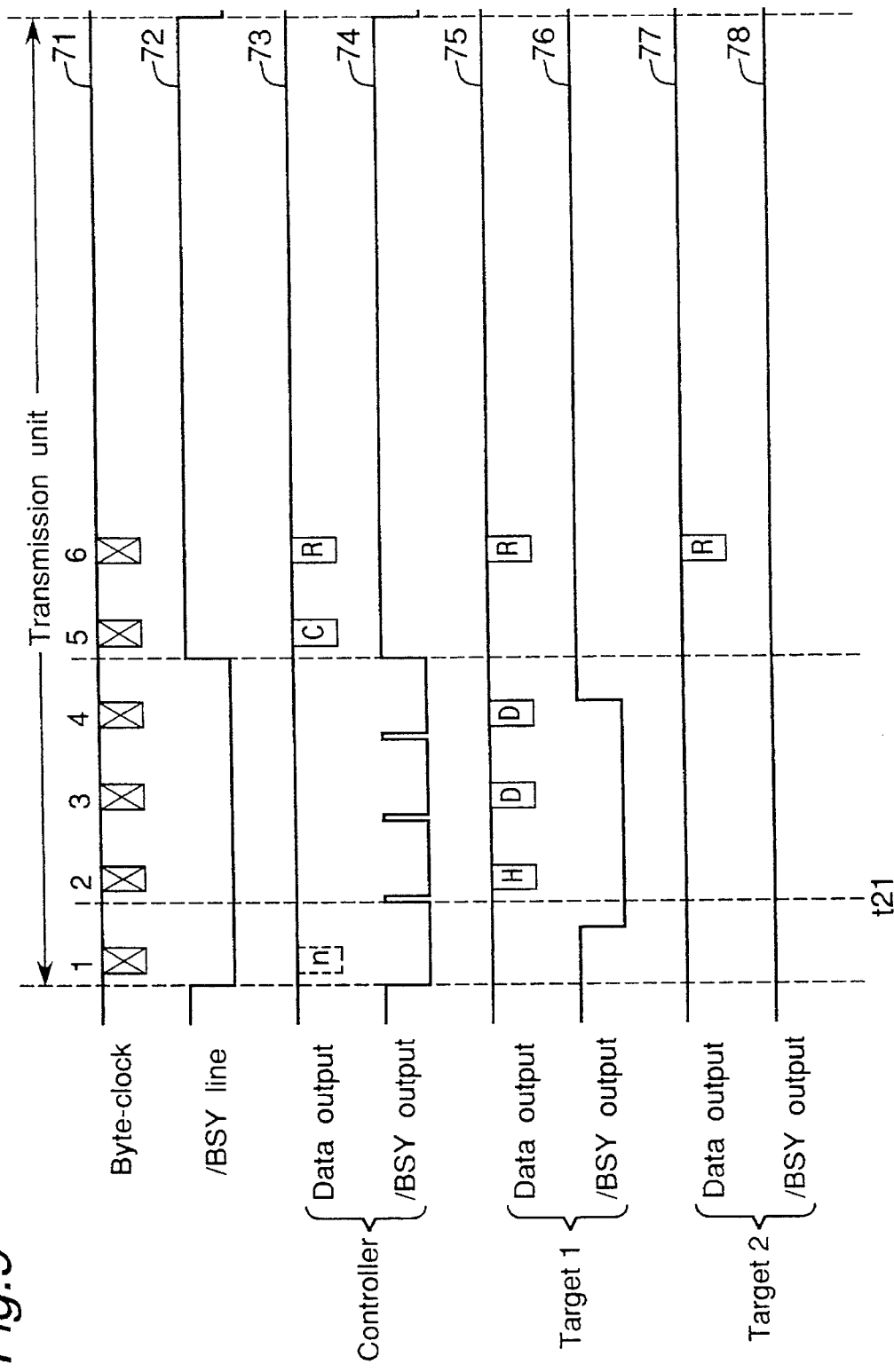
FIG. 9 is a timing chart showing one example of the data frame transfer timing in the preferred embodiment.
Figure 10:
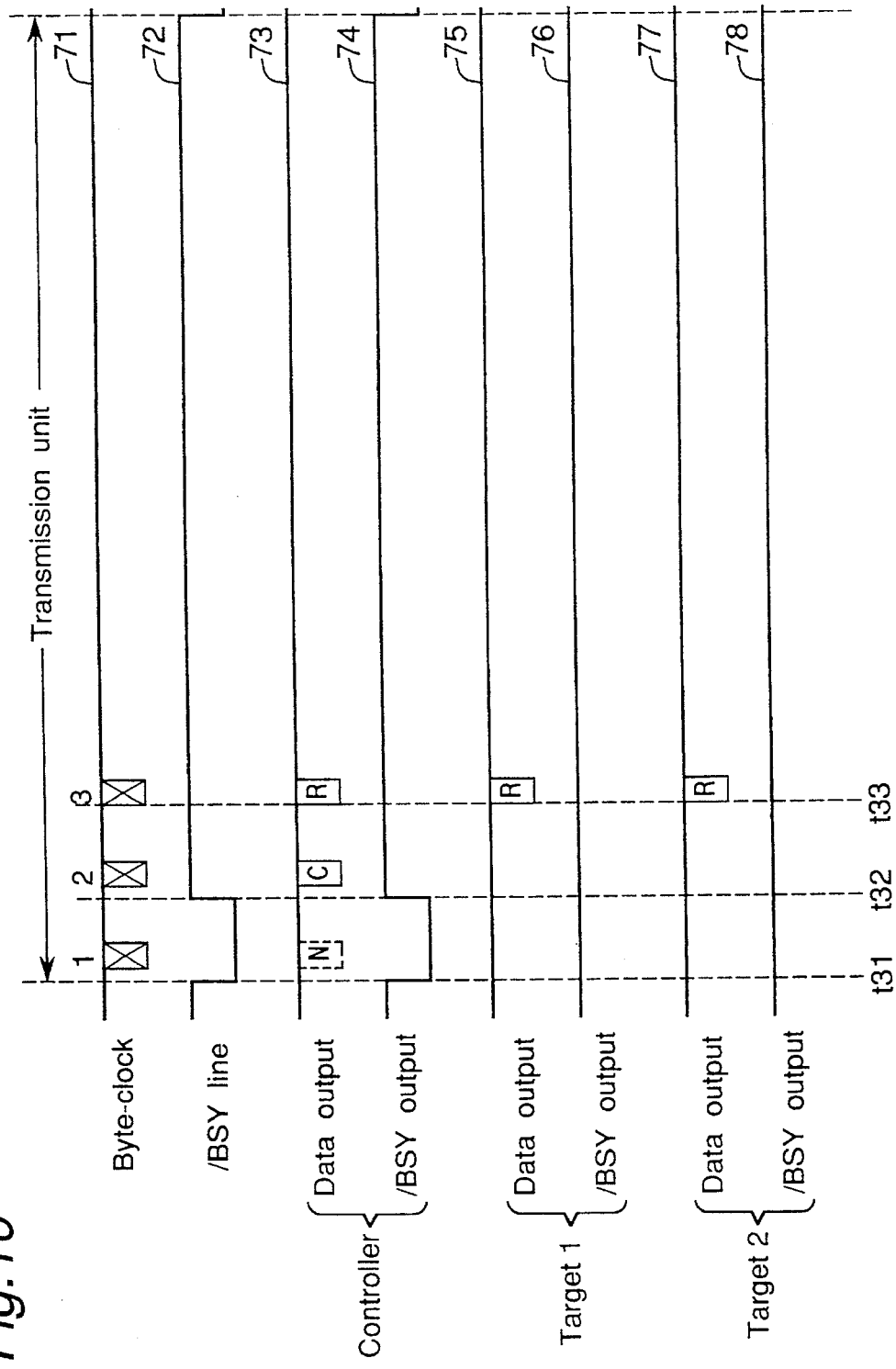
FIG. 10 is a timing chart showing one example of the data frame transfer timing in the preferred embodiment.
Figure 11A:
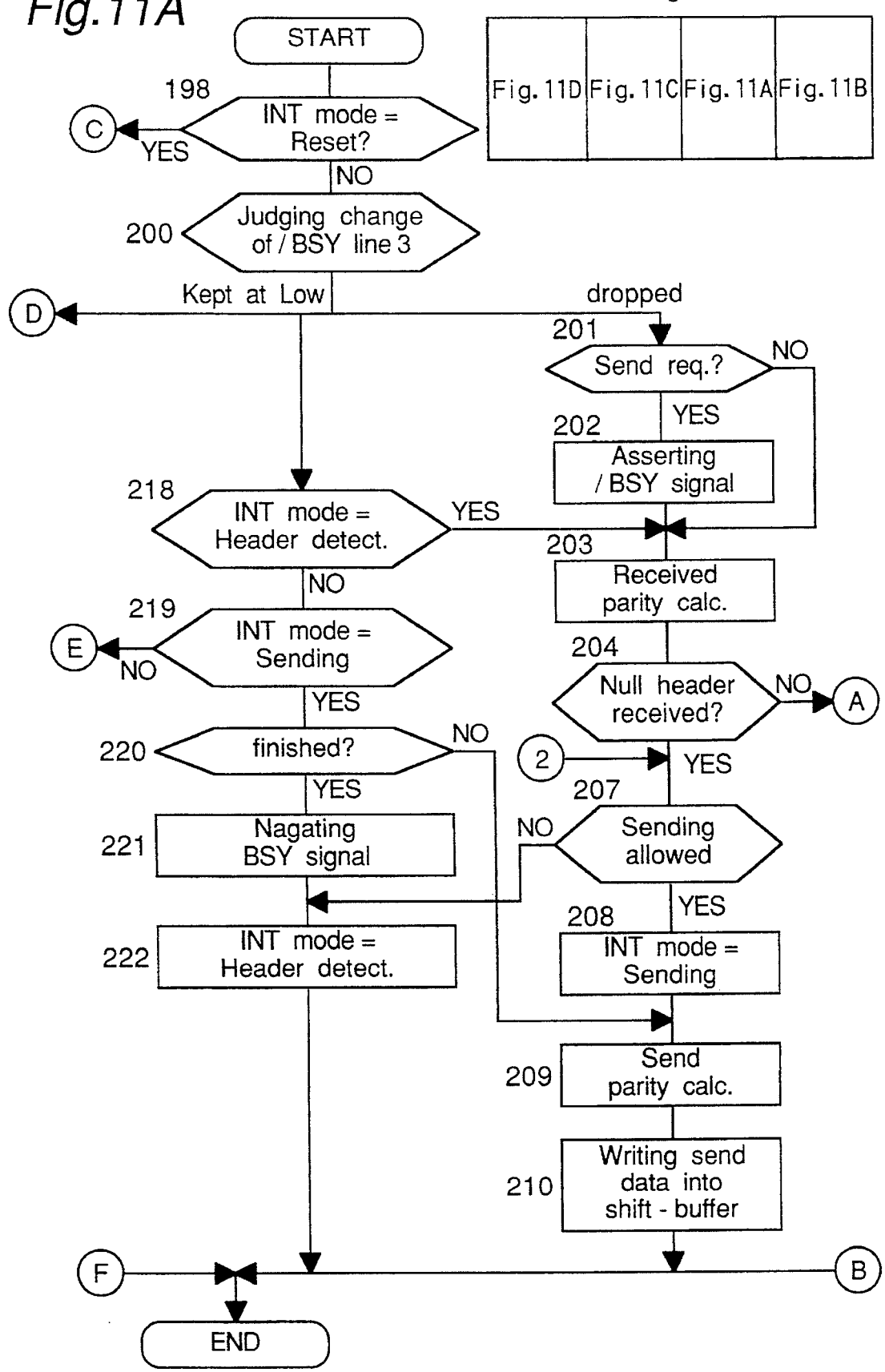
FIG. 11 is a basic flow chart of the serial transfer interrupt processing routine executed by the targets in the preferred embodiment.
Figure 11B:
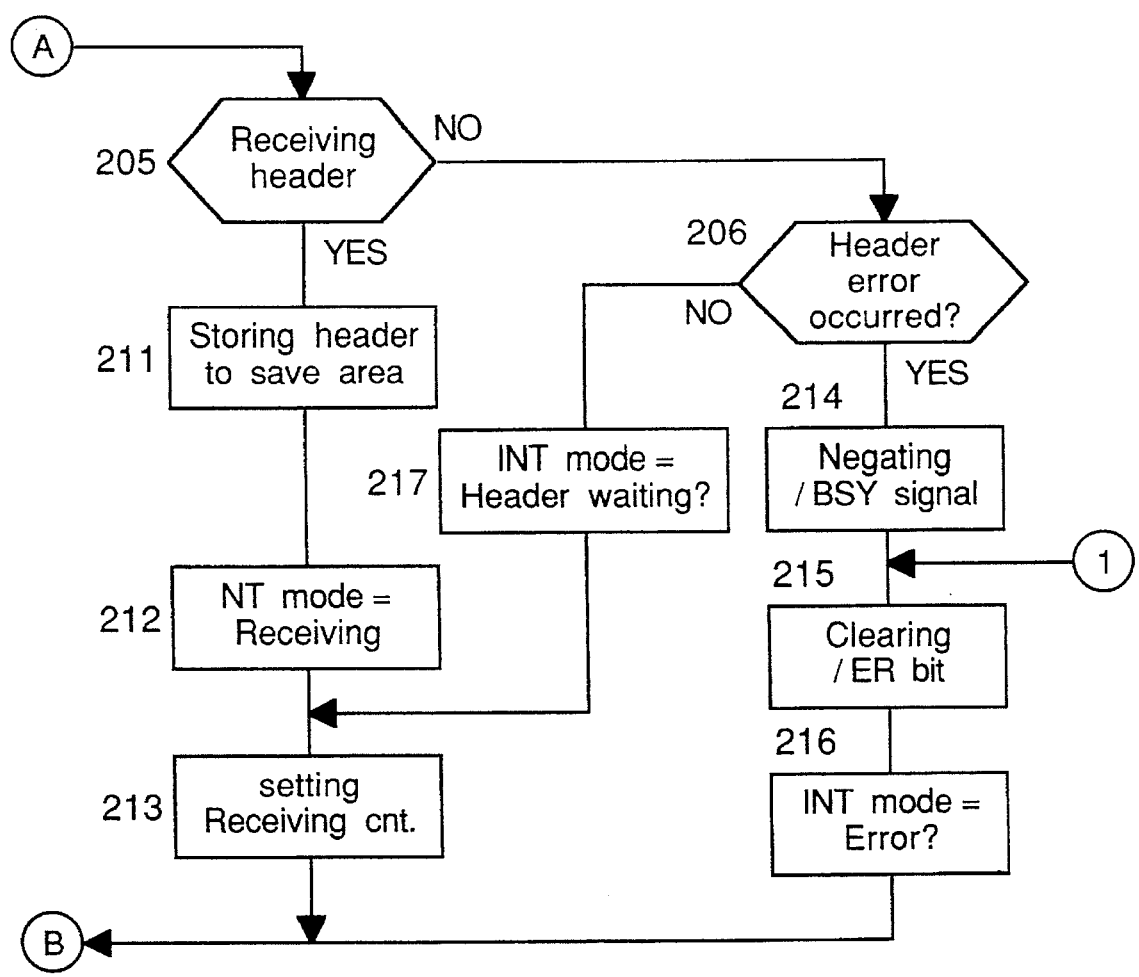
Figure 11C:
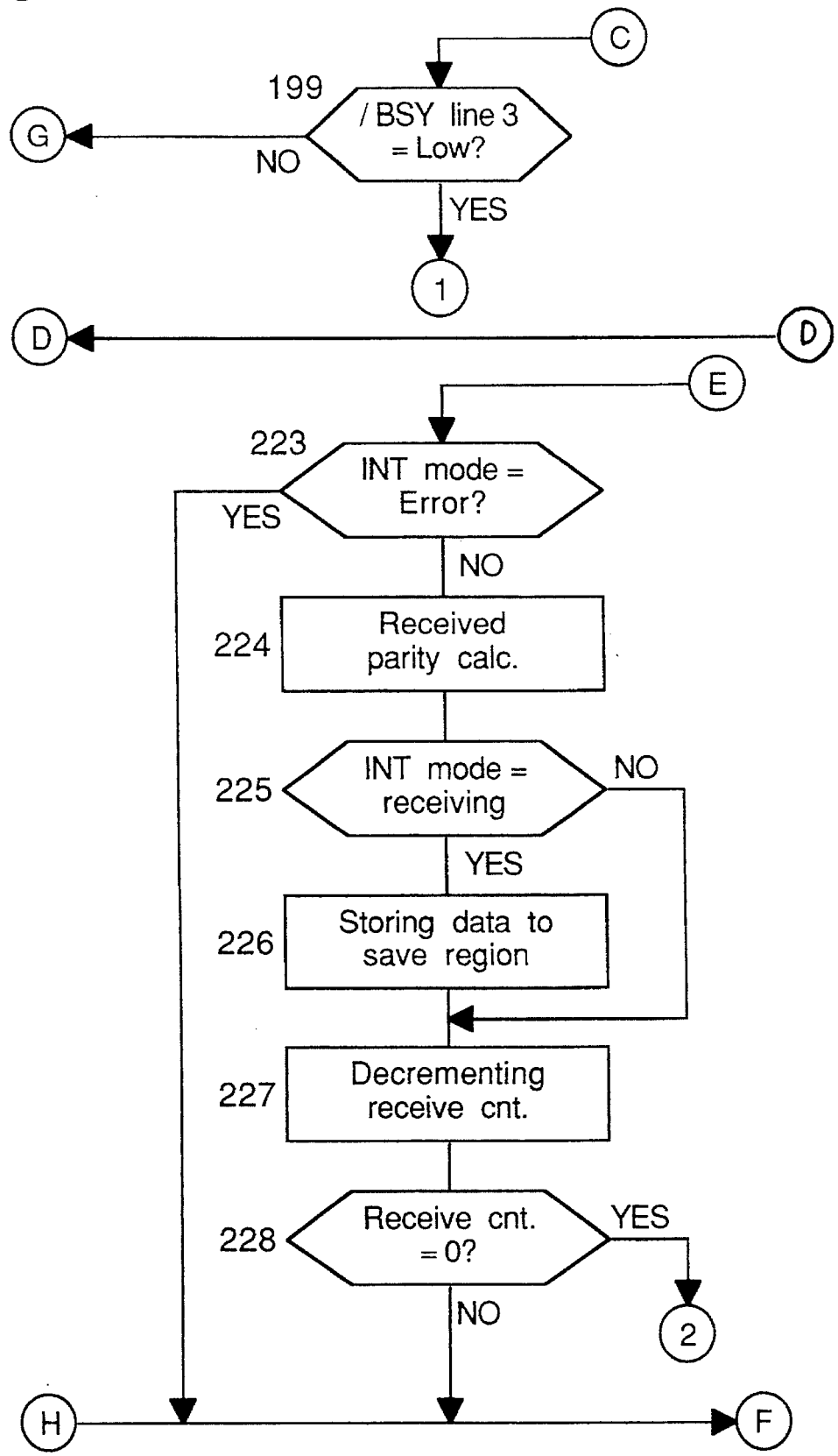
Figure 11D:
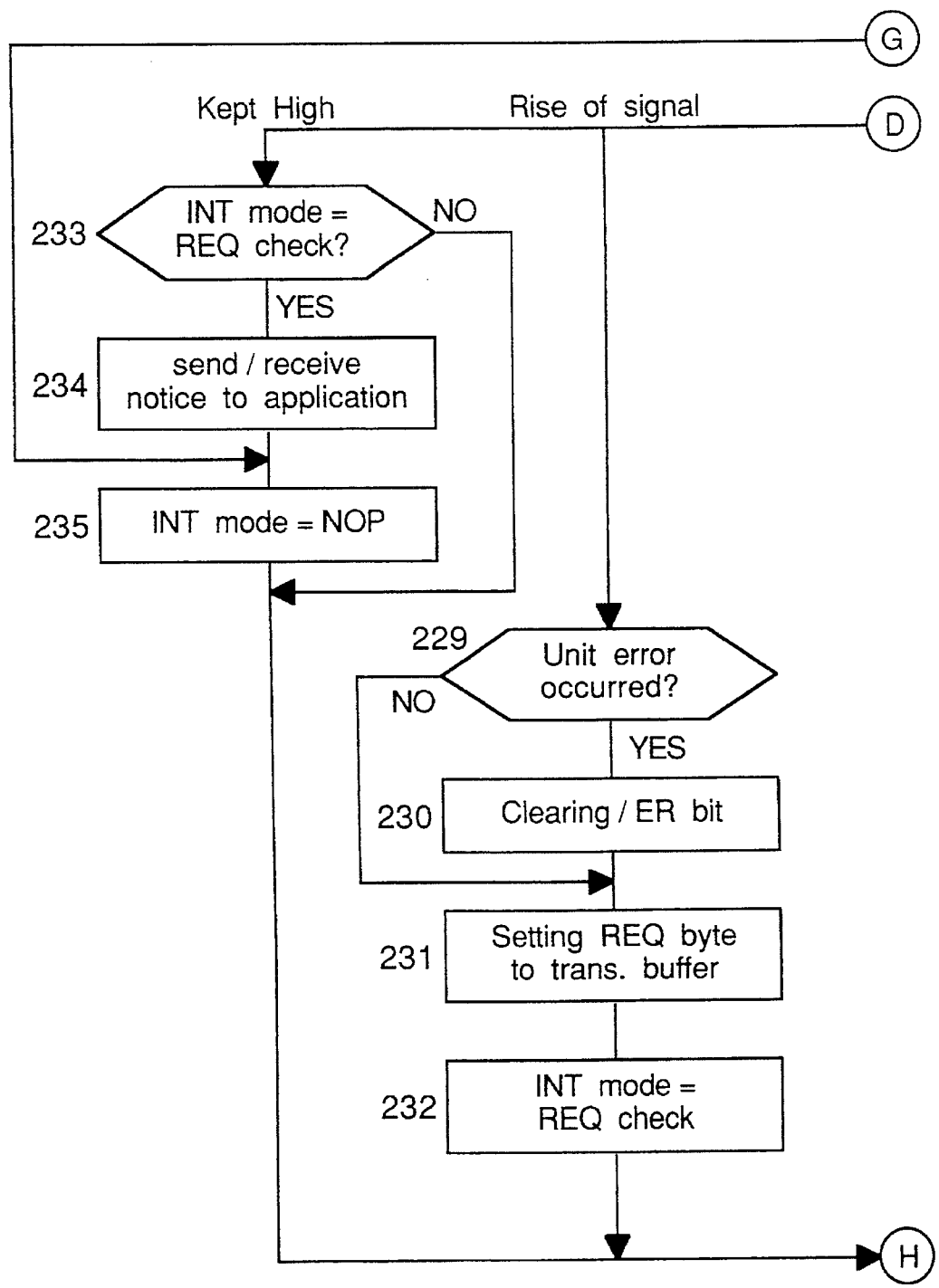
Figure 12A:
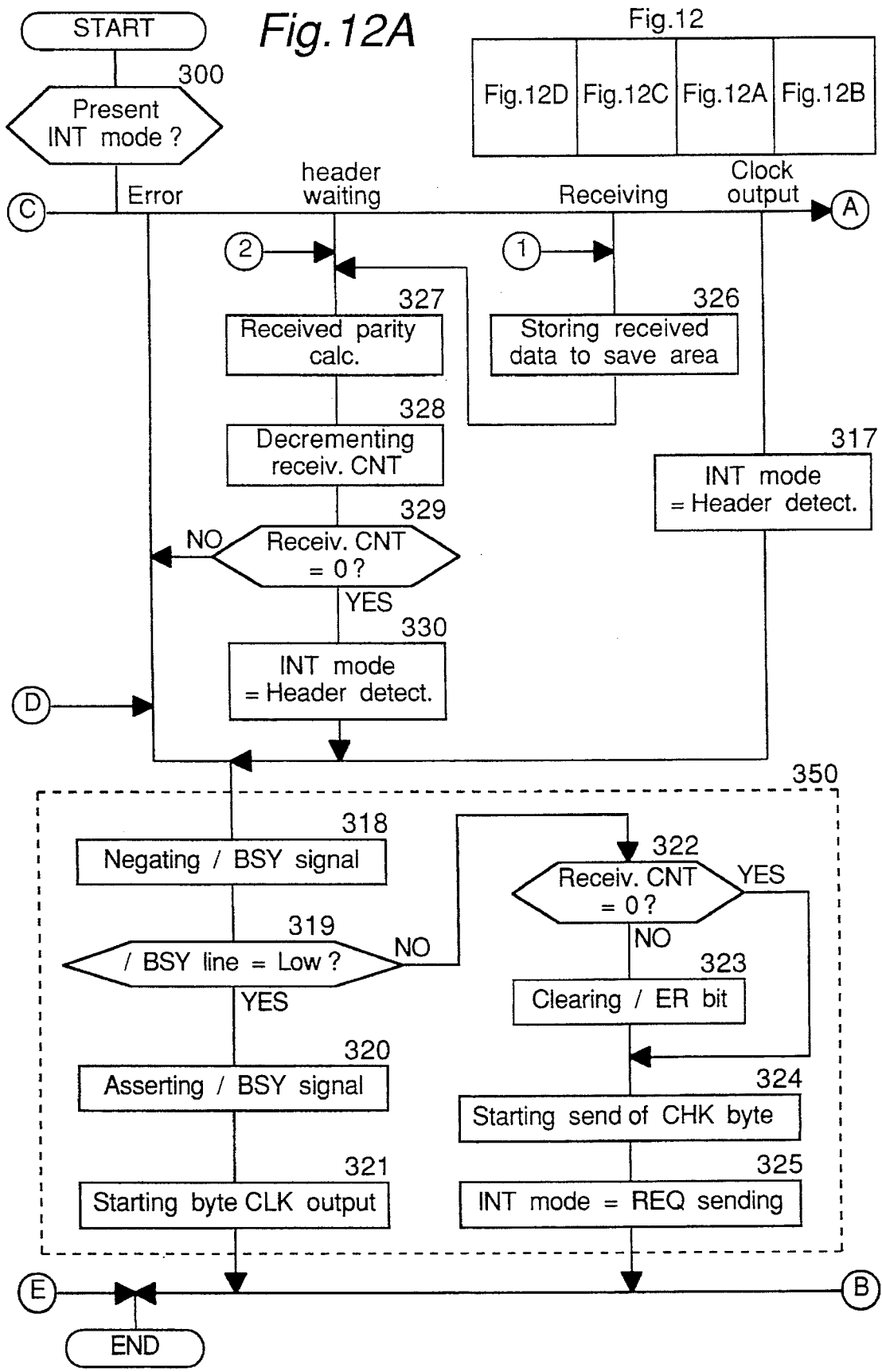
FIG. 12 is a basic flow chart of the timer interrupt processing routine executed by the controller in the preferred embodiment.
Figure 12B:
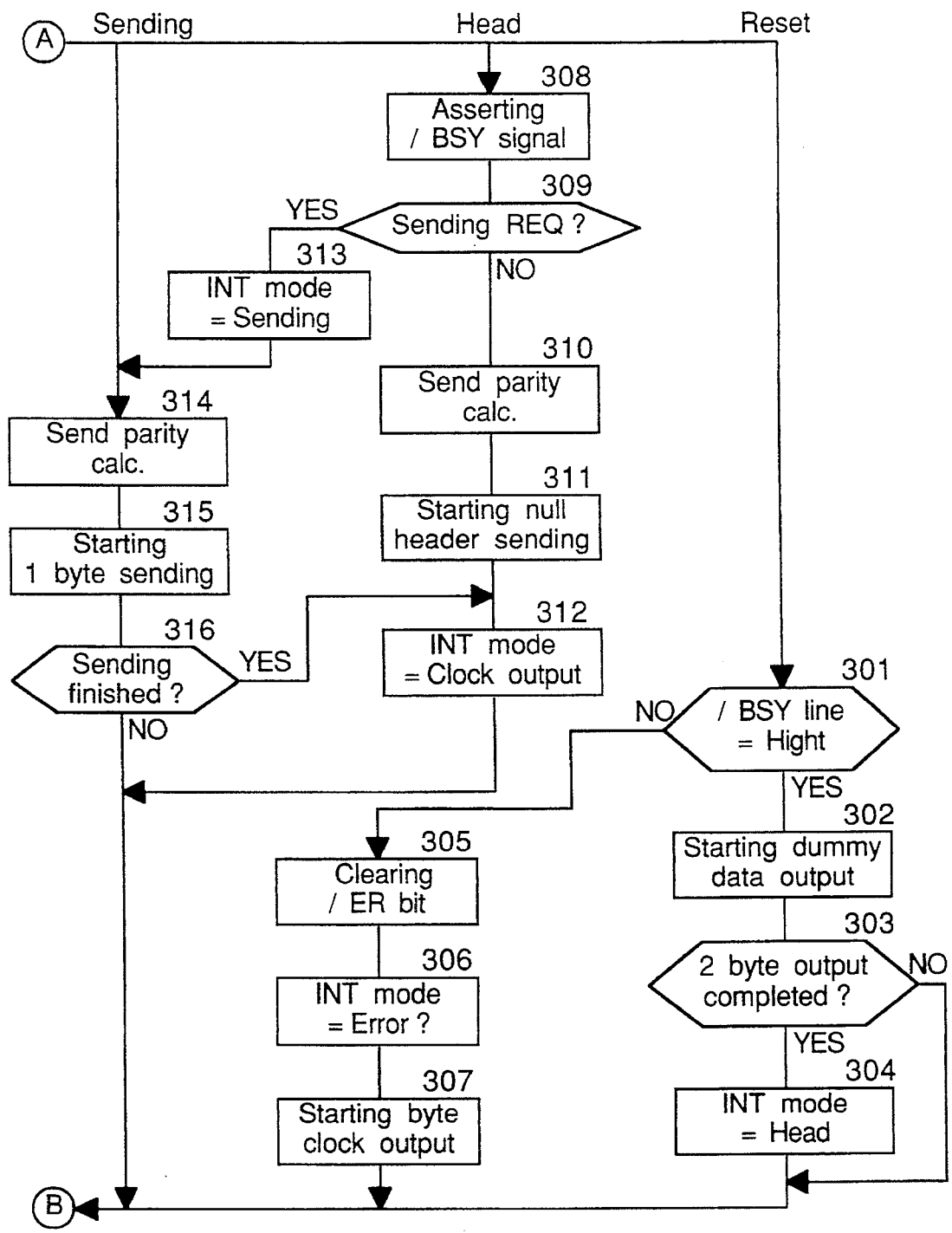
Figure 12C:
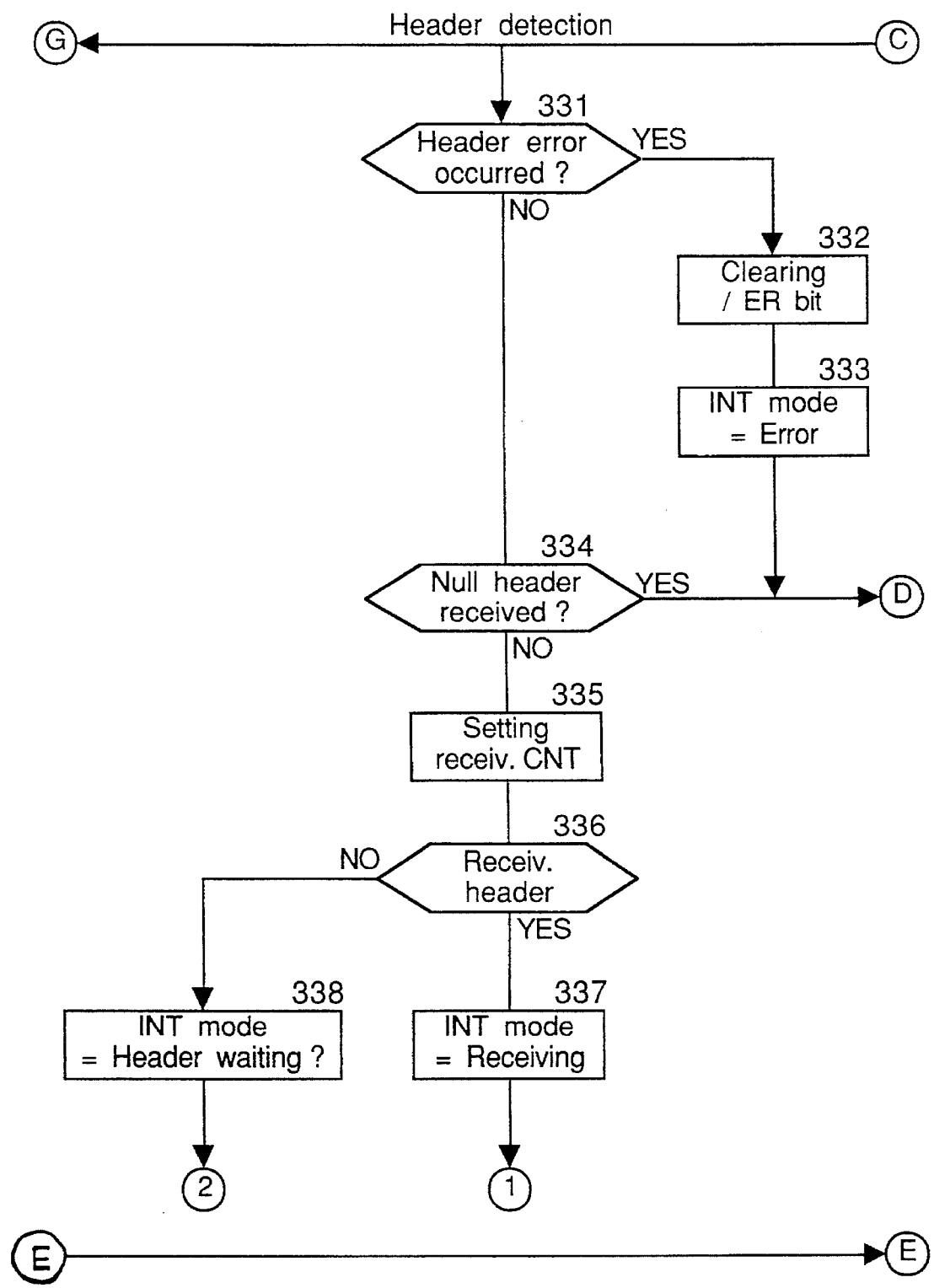
Figure 12D:
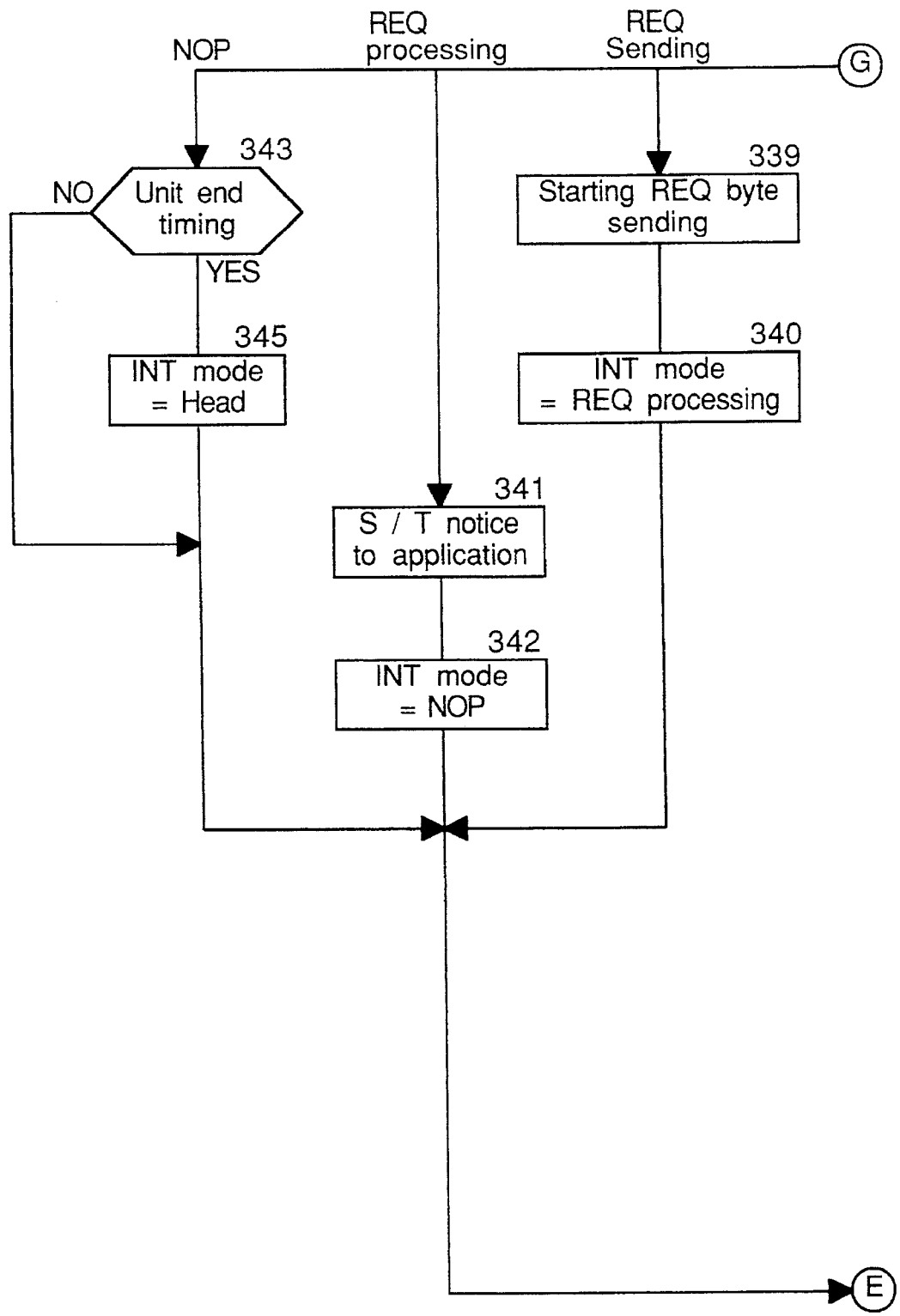

FIGS. 7–10 show the data frame sending timing for a system in which the controller is connected with two targets. FIG. 7 is a timing chart of the transfer units when all microcomputers execute a data frame send. FIG. 8 is a transfer unit timing chart for data frame sending by two microcomputers of the controller and target 2. FIG. 9 is a transfer unit timing chart when only target 1 sends a data frame. FIG. 10 is a transfer unit timing chart when no data is sent by any of the microcomputers.

To simplify the following description using FIGS. 7–10, the number of user data bytes contained in the data frame is two. The following reference numbers are also used in these figures: 71 is the byte clock output by the controller to the clock line 2; 73, 75, and 77 indicate the data output to the data line 1 by the controller, target 1, and target 2, respectively. This data is input to the data line 1 as a wired-OR signal. The /BSY signals output by the controller, target 1, and target 2, respectively, to the /BSY line 3 are indicated as 74, 76, and 78; these signals are similarly wired-OR to the /BSY line 3, resulting in signal level 72 on the /BSY line 3.

Referring to FIG. 7, the controller sends the data header after asserting the /BSY signal at the beginning of the transfer unit. Because targets 1 and 2 have a data frame send request, they immediately assert the /BSY signal after receiving this data header (time t1). The controller then sends the 2-byte user data, ends data frame sending, and negates the /BSY signal at time t2.

The /BSY line 3 remains LOW even through the controller has negated the /BSY signal because target 1 and target 2 are asserting the /BSY signal at this time. As a result, the controller again asserts the /BSY signal and then outputs the byte clock. Target 1 can now begin data frame sending from this byte clock because the controller, which is the only device earlier in the sending order, has completed data frame sending. After target 1 completes data frame sending, it negates the /BSY signal at time t3. The /BSY line 3 remains LOW at this time because target 2 and the controller are asserting the /BSY signal.

At time t3, target 1 and the controller, both of which are earlier in the sending order than target 2, have completed data frame sending, and target 2 therefore starts data frame sending from the next byte clock. When data frame sending is completed at time t5, target 2 asserts the /BSY signal. At time t6, the controller negates the /BSY signal, and sends the CHK byte after confirming the /BSY line 3 is HIGH.

As described above, the CHK byte is the calculated result of an exclusive-OR operation performed in byte units on all data sent over the data line 1 during the LOW /BSY line 3 state. Targets 1 and 2 receive and use this CHK byte to detect errors in the sent data. At the next byte clock, all microcomputers send the REQ byte. The REQ byte is also wired-OR on the data line 1, and the result is input to each microcomputer.

Even if additional microcomputers are added to the serial bus and the added microcomputer sends a data frame, data frame sending is possible without colliding with the data output from the controller and targets 1 and 2 if the added microcomputer is assigned a sending order number greater than that of target 2. The controller always checks for /BSY signal output by any of the other microcomputers before outputting the byte clock when a target is sending a data frame. This is to check whether the /BSY signal has been negated during data frame sending due to a target reset or other abnormal condition, and thus enables immediate termination of the transfer unit if a problem arises.

In the timing chart shown in FIG. 8, data frame sending is executed only by the controller and target 2. Controller operation in this case is the same as that described with reference to FIG. 7, and is therefore omitted below. Target 1, however, does not assert the /BSY signal even when a LOW state is detected on /BSY line 3 (time t11) because it does not execute a data frame send. The controller negates the /BSY signal after it completes data frame sending (time t12), but then reasserts the /BSY signal and outputs the byte clock because the /BSY line 3 remains LOW. Target 1 sends a null header at this byte clock because it has no data to send.

In practice, a null header is effectively sent even when target 1 sends nothing because the null header value is FFh (hexadecimal) as described above. Target 2 detects data frame and null frame sending by the controller and target 1, and then begins data frame sending. Subsequent operation is the same as described above with FIG. 7.

FIG. 9 is a transfer unit timing chart when only target 1 executes data frame sending. In this case, the controller asserts the /BSY signal and then sends a null header. After completing null header sending, the controller outputs the byte clock because /BSY line 3 remains LOW even when the /BSY signal is negated (time t21). Target 1 detects null header sending by the controller, and begins data frame sending synchronized to this byte clock. As shown in FIG. 9, the controller starts the transfer unit even when the controller itself does not send a data frame, and checks whether a data frame send request has been issued by the targets.

FIG. 10 is the timing chart for when data frame sending is not executed by any microcomputers on the serial bus. At time t31, the controller asserts the /BSY signal, then sends a null header. Targets 1 and 2 do not assert the /BSY signal even when a drop on the /BSY line 3 is detected because they have no data frame send request to issue. As a result, /BSY line 3 becomes HIGH when the controller negates the /BSY signal at time t32. In practice, the controller sends the CHK byte at time t32, and the REQ byte is returned by all microcomputers at time t33 even though no data frame sending occurs during this transfer unit.

As shown in FIGS. 7–10, the number of data bytes sent over the data line 1 when the /BSY line 3 is LOW varies with the transfer unit because the microcomputers on the bus only send data frames when a data frame send request occurs.

The interrupt process used for data frame sending by the controller and targets as described above is described in greater detail below.

FIG. 11 is the basic flow chart of the serial send interrupt processing routine ("serial interrupt process" below) executed by the targets. When a target executes a one byte send or receive, it generates a serial transfer interrupt ("serial interrupt" below) according to the operation shown in FIG. 11. More specifically, the serial interrupt process shown in FIG. 11 is executed immediately after the byte clock is input.

When the target is first rebooted after a reset, the INT mode is set to the default "Reset". The INT mode is the status stored in the internal memory of the microcomputer. When a serial interrupt occurs, this status is checked to determine what process the serial interrupt process routine must execute. When a serial interrupt occurs for the first time after startup, step 198 is first executed because the INT mode is "Reset", and step 199 is then executed to detect the level of /BSY line 3. If the /BSY line 3 is LOW, the microcomputer was restarted in the middle of a transfer unit. In this case, the target must invalidate the transfer unit because it is possible that the data frame being sent should be received by that target. As a result, the /ER bit of the REQ byte is cleared (step 215), the INT mode is changed to "Error" (step 216), and the serial interrupt process terminates. While the /BSY line 3 is held LOW after this, the interrupt process routine is terminated by simply evaluating the condition in steps 198, 200, 218, 219, and 223. The transfer unit can be invalidated by clearing the /ER bit of the REQ register as described later below.

If the /BSY line 3 is HIGH at startup, the INT mode is changed to "NOP" at step 235, and remains "NOP" until the /BSY line 3 becomes LOW.

If the controller sets the /BSY line 3 LOW at the beginning of the transfer unit and sends a header, the target executes the process shown in FIG. 11 at the header receive interrupt. At step 200 the signal level of the /BSY line 3 is detected to have dropped, steps 201 and 202 are executed when there is a send request, and the /BSY signal is asserted. An exclusive-OR operation is then executed (step 203) using the received header and the CHK register (not shown in the figures), which is the register for parity operations. The result of this operation is stored to the CHK register.

The CHK register is cleared (also not shown) when a drop is detected on the /BSY line 3. Whether the received header is a null header, the received header is the data header of the data frame that should be received, or a header error has occurred is then determined in steps 204, 205, and 206.

If a null header was received, the microcomputer determines whether it can start data frame sending (step 207). This evaluation checks whether two conditions are satisfied: (1) whether that microcomputer is asserting the /BSY signal, and (2) whether all microcomputers earlier in the sending order have completed data frame or null frame sending. If both conditions are satisfied, the INT mode is changed to "Sending" in step 208, an exclusive-OR operation is performed using the data to be sent and the value in the CHK register (step 209), and the result is written to the CHK register. The data to be sent is also written to the send buffer (shift buffer) in step 210. The data written to the send buffer is the data output to the data line 1 when the byte clock is supplied from the controller to the target.

If the data header of the data frame to be received is received, the received data header is stored to a save area in the microcomputer (step 211). The INT mode is also changed to "Receiving" (step 212), the number of bytes of the user data is obtained from the received data header, and the number of bytes is written to the receive counter.

A header parity check is executed at step 206. If an error is detected in the received header, the /BSY signal is negated (step 214), the /ER bit of the REQ register (not shown in the figures) is cleared (step 215), the INT mode is changed to "Error" (step 216), and the serial interrupt process terminates. If a parity error is not detected in the received header, the INT mode is changed to "Waiting Header" (step 217), and the receive counter is set (step 213).

If the /BSY line 3 is LOW at the second or later serial interrupt after the start of the transfer unit, step 218 is executed. If the INT mode is "Header Detecting", the data received to the receive buffer is a data header or null header; the routine therefore jumps to step 203 for header receive processing. If the INT mode is "Sending", the microcomputer executing this routine is sending the data frame; whether sending is finished, i.e., whether the last byte of the data frame has been sent, is therefore checked (step 220). If sending is not finished, steps 209 and 210 are executed to prepare for sending one data byte at the next byte clock. If sending is finished, the /BSY signal is negated (step 221).

If the /BSY line 3 remains LOW at the next byte clock output timing after sending is completed, another microcomputer is sending a header, and the INT mode is therefore changed to "Header Detecting" (step 222). If the INT mode is "Error", the interrupt processing routine is terminated without doing anything (step 223). If the INT mode is "Receiving" or "Waiting Header", an exclusive-OR operation is performed on the received data and the CHK register data (step 224), and the result is written to the CHK register. If the INT mode is "Receiving", the data received to the receive buffer is stored to a save area in the microcomputer (step 226). The receive counter is also decremented (step 227), and the receive counter is checked for a value of 0 in step 228. If the receive counter is 0, data frame sending by another microcomputer is completed; the routine therefore jumps to step 207 where it is determined whether sending can start.

If the /BSY line 3 is detected HIGH when a serial interrupt occurs, the CHK byte is received to the receive buffer. The received CHK byte is then compared with the value in the CHK register (step 229); if the values match, a send error has not occurred, and the routine advances to step 231. If the values do not match, a data error has occurred in the data sent over the data line 1 when the /BSY line 3 is LOW, and the /ER bit of the REQ byte is therefore cleared (step 230). The REQ byte stored to the REQ register is then written to the send buffer (step 231). This REQ byte is sent over the data line 1 at the next byte clock. The INT mode is also changed to "REQ Check" (step 232).

If a serial interrupt occurs during the "REQ Check" INT mode, the /BSY line 3 remains HIGH and the REQ byte is being received to the receive buffer. This REQ byte is received to the receive buffer as the wired-OR result on the data line 1 of the REQ bytes output by all microcomputers. As a result, when any one microcomputer detects an error, the /ER bit is cleared to 0.

If the INT mode "REQ Check" state is confirmed in step 233, a send/receive notice is issued to the application program (step 234). More specifically, an end flag indicating that the transfer unit has ended is set. The application program knows that the transfer unit has ended by reading this end flag, and reads the received data frame from the save area if the REQ byte /ER bit is 1 because the /ER bit is 1 only when sending/receiving is normal. If the /ER bit is 0, the application ignores the received data frame stored to the save area. The INT mode is then changed to "NOP" in step 235. The byte clock is normally only output twice when the /BSY line 3 is HIGH, but if the controller is reset due to noise, three or more byte clocks may be output from the controller as described later below. The "NOP" INT mode is provided for this situation.

FIG. 12 is a basic flow chart of the timer interrupt processing routine (the "timer interrupt process" below) executed by the controller. The controller uses timer interrupts to intermittently output the byte clock. The controller uses an internal timer to generate interrupts at each byte clock output interval (Tb), and send/receive data frames in one byte blocks during timer interrupt processing.

The controller executes step 300 at the beginning of the timer interrupt process, and executes each process according to the INT mode. When the controller first restarts after a reset, the INT mode is "Reset", and the controller therefore first checks the state of the /BSY line 3 (step 301). The /BSY line 3 is normally HIGH when the system starts up, and dummy data is therefore output (step 302). The controller shift buffer operates at the internal clock, and data sending therefore starts by writing data to the send buffer. This dummy data is data with the bit in the same position as the /ER bit set to 0. If the /BSY line 3 is HIGH after the controller boots up, two bytes of dummy data are output one byte at a time. If the controller is reset when only the controller asserts while asserting the /BSY signal, the /BSY signal is negated and the /BSY line 3 becomes HIGH. If the controller restarts in this state, the controller will have started during a transfer unit. Thus, by outputting two bytes of dummy data at a predetermined interval with the bit position of the /ER bit set to 0, the current transfer unit can be invalidated even when the controller is reset during a transfer unit and the /BSY signal is negated.

If the /BSY line 3 is LOW in step 301, the controller may have been reset while a target was asserting the /BSY signal. In this case, the REQ byte /ER bit is cleared (step 305), the INT mode is changed to "Error" (step 306), and byte clock output begins (step 307). The byte clock is output by writing the bit pattern FFh (hexadecimal) whereby all bits on the data line 1 are HIGH to the send buffer. This is effectively the same as outputting only the byte clock without outputting data.

When the two bytes of dummy data are output, the INT mode is changed to "Head" (step 304). As a result, when the next timer interrupt occurs, step 300 is executed and then step 308 is executed. By asserting the /BSY signal (step 308), the /BSY line 3 is set LOW, and the transfer unit starts. If there is a data frame send request, the INT mode is changed to "Sending" (step 313), an exclusive-OR operation is performed on the CHK register value and data that is sent first, i.e., the data header (step 314), and the result is returned to the CHK register. The CHK register is cleared when the INT mode is changed to "Head" (not shown in the figures). Sending one byte of the data comprising the data frame then begins by writing the data to be sent to the send buffer (step 315). Step 315 is executed once each time a timer interrupt is thereafter applied to send the complete data frame one byte at a time. When the last data comprising the data frame is written to the send buffer in step 315, the send end is detected in step 316, and the INT mode is changed to "Clock Output" (step 312).

If there is no data frame send request (step 309), step 310 is executed at the beginning of the transfer unit to insert a null header to the CHK register. The null header is also written to the send buffer (step 311), and null header sending begins. The INT mode is then changed to "Clock Output" (step 312).

When a timer interrupt occurs during the "Clock Output" INT mode, the INT mode is first changed to "Header Detecting" (step 317). Because the controller has completed data frame or null frame sending at this point, control flows to step 318 where the /BSY signal is negated, and the level of the /BSY line 3 is then detected (step 319). If the /BSY line 3 is LOW even though the /BSY signal is negated, the /BSY signal is reasserted (step 320), and byte clock output begins. The target following the controller in the sending order sends the null header or data header at this byte clock. Data header receive processing is not executed in this interrupt process, but during the next timer interrupt process. To simplify the description of the process from step 318 to step 325, this sequence is defined as the end check routine 350.

If a timer interrupt occurs during the "Header Detecting" INT mode, the first step (331) is to check for header errors. If a header error is detected, the REQ byte /ER bit is cleared (step 332), and the INT mode is changed to "Error" (step 333).

When the INT mode changes to "Error", the end check routine 350 is repeated until all targets negate the /BSY signal. If a header error was not detected in step 331, it is determined whether the received header is a null header (step 334). When the received header is a null header, the end check routine 350 is again executed to check whether the targets have negated the /BSY signal. If a null header is received, the data sent next by the target is also a header, and the INT mode therefore remains in the "Header Detecting" state. If the received header is a data header, the size of the complete data frame (i.e., the user data byte size+1) is obtained from the data header and written to the receive counter (step 335). It is also checked whether the received data header is the data header of a data frame that should be received (step 336); if the data frame is to be received, the INT mode is changed to "Receiving" (step 337); if not, the INT mode is changed to "Waiting Header" (step 338).

If the INT mode is "Receiving", control flows to step 326 and the data being received to the receive buffer is stored to the save area, but if the INT mode is "Waiting Header", the procedure jumps directly to step 327.

A parity calculation is executed using the received data in step 327, the receive counter is decremented in step 328, and the end of data frame sending by the target is then detected (step 329). If data frame sending has ended, the INT mode is changed to "Header Detecting" (step 330), and the end check routine 350 is executed. If sending has not ended, the end check routine 350 is executed without changing the INT mode.

If the /BSY line 3 is HIGH at step 319 of the end check routine 350, a receive counter value of 0 is checked (step 322). If the receive counter is any value other than 0, the target negates the /BSY signal without sending the specified number of user data bytes, and the /ER bit is therefore cleared (step 323). If the receive counter is 0, CHK byte sending is started immediately by writing the contents of the CHK register to the send buffer. If the INT mode is "Error" the receive parity operation (step 327) is not executed, and the value of the CHK byte beginning sending (step 324) is not the correct value. This poses no problem, however, because if the INT mode is "Error" a REQ byte with a cleared /ER bit is sent. The INT mode then changes to "REQ sending" and the interrupt process ends.

If the timer interrupt process starts in the "REQ sending" INT mode, REQ byte sending is started by writing the REQ byte stored to the REQ register to the send buffer (step 339). The timer interrupt process can then be ended by simply changing the INT mode to "REQ Processing" (step 340).

The next timer interrupt starts in the "REQ Processing" INT mode. The send/receive notification to the application executed in step 341 is the same process executed by the target in step 234 (FIG. 11). The INT mode is then changed to "NOP" (step 342) to end the timer interrupt process.

The next timer interrupt starts in the "NOP" INT mode, but the byte clock is not output in the "NOP" INT mode. More specifically, whether the present timing is the transfer unit end timing is checked (step 343), and the INT mode is changed to "Head" (step 345) at the timing where the transfer unit is started from the next timer interrupt.

In the preferred embodiment of the invention described above, the target that has become the master must write the data to the send buffer before the next byte clock is output because the controller outputs the byte clock at a constant interval. If this write operation is not completed in time, the controller is so notified and byte clock output is delayed by the method described below.

Figure 13:
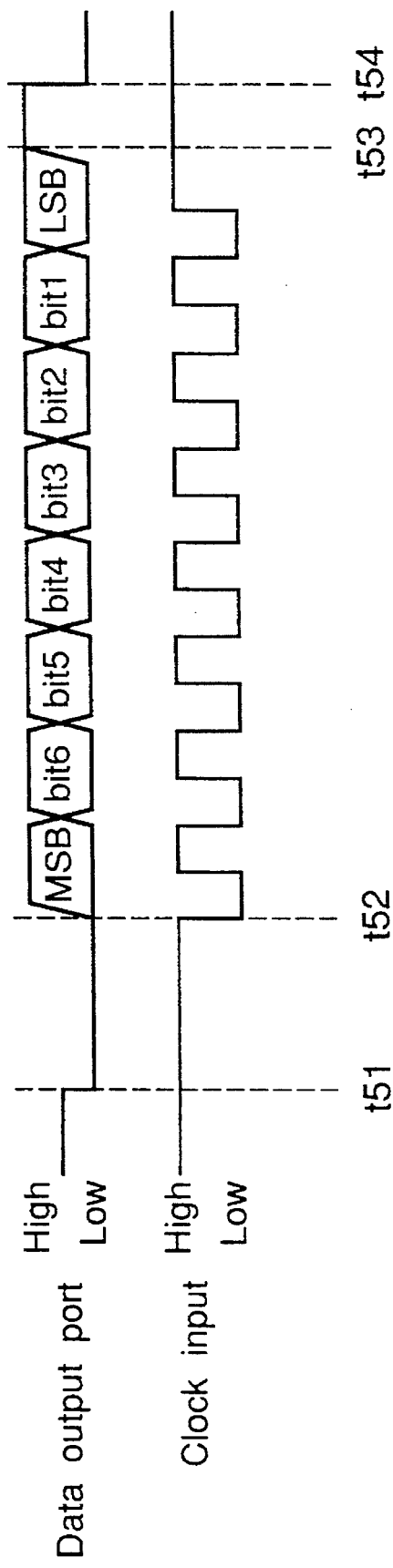
FIG. 13 is a timing chart of serial transfers with start-condition.

FIG. 13 is a timing chart of serial transfers with start-condition as implemented in a single chip microcomputer (e.g., Mn18888, mfg. Matsushita Electric Industrial Corporation). The external clock and the timing for conditional start transfers with start-condition are shown. When serial data send preparations are completed (time t51), i.e., when the data to be sent is written to the internal shift buffer, the data output port is changed from a HIGH impedance state to a LOW state. When clock input starts in this state (time t52), one byte of data is sent in sequence from the MSB through the data output port. After the LSB is output (time t53), the data output port is set HIGH. After waiting a predetermined period, the data output port is reset HIGH (time t54).

The primary purpose of start-condition is to synchronize byte units at the send and receive sides. In other words, before sending data, the data line is set LOW during the clock line is HIGH, thereby resetting the receive-side clock counter and making it possible to synchronize send and receive side byte units. Thus, one objective of start-condition is to prevent bit shifting due to noise. By using this conditional start function, the data line can be driven LOW by the target simply writing the send data to the shift buffer.

If a microcomputer that serially transfers data at the timing shown in FIG. 13 is used as the target, the data output port is a tristate output port, and an open collector output gate is inserted between the data output port 17 and the data line 1.

The controller checks the status of the data line 1 between steps 320 and 321 of the end check routine 350. If the data line 1 is HIGH, the timer interrupt process is ended without executing step 321. In this case, it is only necessary to execute the end check routine 350 in the next timer interrupt process. If the data line 1 is LOW, the master target has completed data send preparations, and byte clock output begins.

The above method can check completion of data send preparations by the target using the start-condition, and thus prevent data send dropouts.

A method whereby the target can detect byte clock output by the controller before the target has completed send preparations is described next.

In general, the shift buffer comprises a counter for counting the number of clocks input from the clock input port 15. This counter is cleared by writing data to the send buffer, and is incremented at the clock rise. The clock is also cleared to 0 when a one byte send clock, i.e., eight clocks, have been input. As a result, this counter is always 0 when a serial interrupt occurs. If, for example, the bit clock period is 10 μsec, this counter shows a non-zero value for 70 μsec. As a result, the target checks this counter at least once every 70 μsec while executing the serial interrupt process. If the counter becomes a non-zero value before the interrupt process is completed, the controller has output the next byte clock. In this case, the target can invalidate the transfer unit by negating the /BSY signal, stopping sending, and sending a REQ byte with a /ER bit of 0.

The error detection capability is described next. In this embodiment a parity check is used for error detection. A parity check is normally not able to detect errors if a bit error occurs in two places. For example, if parity is created in byte units, detection is not possible if an error occurs in two bits in the same position. Error detection is also not possible in the present embodiment if errors occur in the same bit positions in the same data frame, but error detection is possible when errors occur in the same bit positions in different data frames. For example, let us assume that the controller and target 1 send data frame A and data frame B, respectively, during the same transfer unit, a one bit bit error occurs in data frame A, and a bit error occurs in data frame B in the same bit position as the error in data frame A. Each microcomputer uses two kinds of data as follows upon calculating CHK bytes;
a) data before sending (namely, correct data) for the data sent by itself, and
b) data input through the serial bus from other microcomputer for the data sent from other microcomputer. As a result, the data frames used by the respective microcomputers for the CHK byte calculation are as shown in Table 6.

TABLE 6

| | Data frame used for CHK byte calculation |
|---|---|
| Controller | Correct data frame A, error data frame B |
| Target 1 | Error data frame A, correct data frame B |
| Target 2 | Error data frame B, error data frame B |

Because both the controller and target 1 calculate the CHK byte using a data string containing one error, the calculation results are the same and error detection is not possible. Target 2 calculates the CHK byte using a data string in which there are two errors, however, and the calculation result does not match the CHK byte output by the controller. As a result, target 2 sends a REQ byte with an /ER bit of 0, thus notifying the controller and target 1 that a send error has been detected. As a result, the data transfer method of the invention provides an error detection capability approximately equivalent to error detection adding a one-byte parity check byte to each data frame even though a one-byte parity check byte is used for plural data frames.

As described above, the controller in the data transfer method of the preferred embodiment begins data frame or null frame sending after asserting the /BSY signal on the /BSY line 3. Targets with a data frame send request assert the /BSY signal while the /BSY line 3 is held LOW by the controller. If the /BSY line 3 remains LOW even though the /BSY signal is negated, the controller outputs the send clock until the /BSY line 3 becomes HIGH. After the controller and all targets earlier in the sending order have completed data frame or null frame sending, the next target in the sending order begins data frame sending synchronized to the send clock, and then negates the /BSY signal when data frame sending is completed. As a result, microcomputers can be easily added to or removed from the serial bus, and data frame sending can be executed by all microcomputers with a data frame send request without collisions.

The controller also intermittently outputs the unit clock required to send one transfer unit of data, and outputs the unit clock after reasserting the /BSY signal if the /BSY line 3 remains LOW at the unit clock output timing even through the controller has negated the /BSY signal after completing data frame or null frame sending. The targets negate the /BSY signal immediately after completing data frame sending. It is therefore not necessary to use an external interrupt to monitor the /BSY line 3.

The controller also calculates the error detecting code for all data sent over the data line 1 while the /BSY line 3 is LOW using the data sent by the controller over the data line 1 and the data received from the data line 1, and sends the error detecting code after the /BSY line 3 changes to HIGH. All targets detect the existence of transfer error using three kinds of data as follows;
a) data sent on the data line by itself,
b) data received from the data line,
c) error detection code received from the data line, and send a REQ byte with an /ER bit of 0 when an error is detected. It is therefore not necessary to add an error detecting code to each data frame, and efficient data frame sending can be achieved because it is not necessary to separately acknowledge each data frame.

An error detecting code for detecting send errors in the data header is also added to the data header. When a target detects a send error in the data header, it negates the /BSY signal to immediately end the current transfer unit when an error occurs, and thereby prevents unnecessary data sends.

In addition, the controller and all targets send a REQ byte with a 0 /NDR bit when a data frame that should be received by that microcomputer is not received. If the /NDR bit of the received REQ byte is 0, the controller and all targets will sequentially send all data frames that the sender should send until a REQ byte with a /NDR bit of 1 is received. Thus, while this is an event-driven data transfer method, all required data frames can be quickly recovered by sending the lost data from the other microcomputer again by making /NDR bit zero even when the data having been received and stored until now are lost by occurrence of a trouble such as reset.

Furthermore, the controller sends a REQ byte with a 0 /ER bit if the /BSY line 3 returns to HIGH before the master sends the full user data data length as specified in the data header sent by the master. This makes it possible to invalidate data frame sending when the target sending the data frame is reset.

If the control line is LOW when a target boots up, the target sends a request code with the error detecting bit set TRUE. Accordingly, it becomes possible to start the transfer unit after all microcomputers have been started up even if there are variations in the startup time after reset among them.

In addition, if the control line is LOW when the controller boots up, the controller outputs the clock to the clock line 2 until the /BSY line 3 becomes HIGH, and then sends a 0 /ER bit REQ byte once the /BSY line 3 becomes HIGH. If the /BSY line 3 is HIGH when the controller boots up, it sends a request code with a TRUE error detecting bit before asserting the /BSY signal. As a result, all data sends occurring during the transfer unit in which the controller is reset can be reliably invalidated.

The target sending a data frame sets the data line LOW when send preparations for the one transfer unit of data comprising the data frame are completed. The controller outputs the unit clock after reasserting the /BSY signal if the data line is LOW at the unit clock output timing after completing data frame or null frame sending and the /BSY line 3 remains LOW even through the controller has negated the /BSY signal. As a result, the controller can output the unit clock after confirming that the target has completed data send preparations.

It is to be noted that while microcomputers are used as the devices connected to the serial bus in the above embodiment, the devices connected to the serial bus shall not be limited to microcomputers, and other LSI devices such as digital signal processors can also be connected to the serial bus.

In addition, a parity check code is used as the error detecting code in the above embodiment, but it is also possible to use a cyclic redundancy check code or other error detecting code.

Furthermore, while each microcomputer is assigned one slot in the sending order in the above embodiment, it is also possible to assign plural sending order slots to a single microcomputer to enable that single microcomputer to send plural data frames during a single transfer unit.

The byte clock cycle is also constant in the above embodiment, but the byte clock does not need to be constant if the byte clock is output intermittently. For example, it may require relatively more time to execute the data header receive process than other data receive processes, e.g., setting the receive counter and the data header evaluation process. In such cases, the controller may temporarily increase the timer interrupt cycle to provide the targets more processing time during data header sends and receives.

The controller in the above embodiment also ends timer interrupt processing without waiting for byte clock outputting to end, and at the next timer interrupt executes receive processing for data sent at the previously output byte clock, but it is also possible to wait for the end of byte clock output during the timer interrupt process, and then execute data receive processing. It is also possible to output the byte clock at the timer interrupt, and to execute receive processing in the serial interrupt process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data transfer method for serially sending data frames between one controller and one or more targets for which the order of sending data is predetermined, comprising the steps of:

connecting said one controller and said one or more targets with a bidirectional data line for serially sending data constituting at least one data frame in a transfer unit, a clock line for intermittently supplying unit clocks required for sending one transfer unit of data at a predetermined output timing from said controller to said one or more targets, and a bidirectional control line;

said controller sending a data frame or null frame through said bidirectional data line in synchronization with said unit clocks after beginning a LOW level output to said control line when said control line is HIGH;

each target having a transmission request of a data frame beginning a LOW level output to said control line while said control line is held LOW by said controller;

said controller outputting said unit clocks after resuming a LOW level output to said control line if said control line remains LOW even though said controller stops a LOW output to said control line at an output timing of said unit clock after finishing transmission of the data frame or null frame; and said each target, outputting a LOW level to said control line, beginning transmission of a data frame in synchronization with said unit clock after completion of transmission of the data frame or null frame by said controller and all targets having a priority in the sending order which is higher than that of the pertinent target, and stopping a LOW output to said control line by the next output timing of a unit clock after completing transmission of the data frame.

2. A data transfer method according to claim 1 wherein the target sending a data frame changes the data line to LOW when send preparations for one transfer unit of data comprising a data frame are completed, the controller outputs the unit clock after resuming LOW output to the control line if the data line is LOW at the unit clock output timing after ending data frame or null frame sending, and the control line remains LOW even though LOW output to the control line ends, and the target sends one transfer unit of data synchronized to the unit clock, and changes the data line to HIGH when it stops data sending.

3. A data transfer method for serially sending data frames between one controller and one or more targets for which the sending order is predetermined and which are mutually connected to a three line signal bus comprising a bidirectional data line for serially sending at least the data comprising a data frame, a clock line for supplying the send clock for the data sent over the data line from the controller to the targets, and a bidirectional control line, and characterized by the controller starting data frame or null frame sending after outputting a LOW level to the control line when the control line is HIGH, and stopping LOW output to the control line after ending data frame or null frame sending, targets with a data frame send request beginning LOW level output to the control line when the control line is held LOW by the controller, the controller outputting the send clock until the control line becomes HIGH if the control line remains LOW even though the controller stops LOW output to the control line, and the target outputting a LOW level to the control line beginning data frame sending synchronized data to the send clock after the controller and all targets earlier in the sending order complete data frame or null frame sending, and stopping LOW output to the control line after it completes data frame sending.

4. A data transfer method according to claim 1 or 3 wherein the null frame comprises a fixed length null header, the data frame comprises a fixed length data header and variable length user data, and the data header contains data indicating the type and length of the user data, and the target outputting a LOW to the control line detects the data frame end by counting the data length of the user data, and detects the end of data frame or null frame sending by the controller and all targets earlier in the sending order by counting the number of data frames and null frames.

5. A data transfer method according to claim 4 wherein the controller calculates an error detecting code for all data sent over the data line while the control line is LOW using the data sent over the data line by the controller and the data received by the controller from the data line, and outputs the error detecting code after the control line becomes HIGH, and all targets detect send errors using the data sent by that respective target over the data line, the data received from the data line, and the received error detecting code, and send at a predetermined timing a request code in which at least one error detecting bit is set TRUE when an error is detected.

6. A data transfer method according to claim 5 wherein the data header further comprises an error detecting code for detecting send errors in the data header, the controller sends a request code with a TRUE error detecting bit when a send error is detected in the data header, and the targets stop output if outputting a LOW to the control line when a send error is detected in the data header, and send a request code with a TRUE error detecting bit.

7. A data transfer method according to claim 5 wherein the controller and targets send a request code with at least one TRUE data frame request bit if a data frame that should be received is not received, and when the data frame request bit of the received request code is TRUE, the controller and each target sequentially send all data frames that each device should send until a request code with a FALSE data frame request bit is received.

8. A data transfer method according to claim 5 wherein the controller sends a request code with a TRUE error detecting bit when the control line becomes HIGH before the sending target sends all of the data indicated by the user data length specification of the data header.

9. A data transfer method according to claim 5 wherein the targets send a request code with a TRUE error detecting bit if the control line is LOW when the target boots up.

10. A data transfer method according to claim 5 wherein the controller outputs the clock to the clock line until the control line becomes HIGH and sends a request code with a TRUE error detecting bit if the control line is LOW when the controller boots up, and if the control line is HIGH when the controller boots up, the controller outputs a request code with a TRUE error detecting bit at least twice before outputting LOW to the control line.

11. A data transfer system comprising: a plurality of microcomputers one of which is designated as a controller and remainder of which are designated as targets each having its own sending order of data allocated beforehand, and a serial data bus including a bi-directional serial data line through which data sending and data receiving is made, a clock line which sends clock signals generated by said controller to each of said targets, and a bi-directional control line which is assertable and negatable by any one of said controller and targets, wherein said controller sends a data frame or a null frame to said serial data line according to whether or not a data sending request exists after asserting said control line, each target outputs an output for asserting said control line while said control line is kept in an asserted state by said controller if it has a sending request of a data frame, and, when said controller and foregoing targets have completed data frame or null frame sending, starts a data frame sending and, if it has not any sending request of a data frame, outputs a null frame to said data line without outputting any output for asserting said control line, and, when it has completed said frame sending, it stops said output for asserting said control line.

\* \* \* \* \*